United States Patent
Igarashi et al.

(10) Patent No.: US 6,869,136 B2
(45) Date of Patent: Mar. 22, 2005

(54) REAR STRUCTURE OF VEHICLE BODY

(75) Inventors: Masanori Igarashi, Tokyo (JP); Hirokazu Kuroda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/689,689

(22) Filed: Oct. 22, 2003

(65) Prior Publication Data

US 2004/0108754 A1 Jun. 10, 2004

(30) Foreign Application Priority Data

Nov. 1, 2002 (JP) ......................................... 2002-320084

(51) Int. Cl.$^7$ .............................................. B62D 21/06
(52) U.S. Cl. ...................................................... 296/204
(58) Field of Search ............................. 296/29, 187.01, 296/187.08, 187.11, 193.01, 193.07, 193.08, 203.01, 203.04, 204

(56) References Cited

U.S. PATENT DOCUMENTS

| | | | | |
|---|---|---|---|---|
| 2,820,645 A | * | 1/1958 | Schilberg ..................... 280/794 |
| 3,761,108 A | * | 9/1973 | Hemmings .................. 280/788 |
| 4,570,973 A | * | 2/1986 | Ewers et al. ................. 280/800 |
| 5,074,587 A | * | 12/1991 | Schwede et al. ............ 280/781 |
| 5,110,177 A | * | 5/1992 | Akio ......................... 296/187.11 |
| 5,114,184 A | * | 5/1992 | Shimomura et al. ........ 280/784 |
| 5,259,660 A | * | 11/1993 | Haesters ..................... 296/204 |
| 5,259,661 A | * | 11/1993 | Thum ........................ 296/204 |
| 5,466,005 A | * | 11/1995 | Kohlmeier et al. ......... 280/781 |
| 5,567,005 A | * | 10/1996 | Kosuge et al. .............. 296/204 |
| 5,954,364 A | * | 9/1999 | Nechushtan ................ 280/781 |
| 6,003,935 A | * | 12/1999 | Kalazny ...................... 296/204 |
| 6,092,865 A | * | 7/2000 | Jaekel et al. ................ 296/205 |
| 6,120,060 A | * | 9/2000 | Kocer et al. ................ 280/788 |
| 6,123,378 A | * | 9/2000 | Teply et al. ................. 296/29 |
| 6,205,736 B1 | * | 3/2001 | Amborn et al. .............. 52/633 |
| 6,270,153 B1 | * | 8/2001 | Toyao et al. ................ 296/204 |
| 6,398,260 B1 | * | 6/2002 | Rinehart ..................... 280/781 |
| 6,679,523 B2 | * | 1/2004 | Yamamoto et al. ......... 280/785 |
| 2001/0000119 A1 | * | 4/2001 | Jaekel et al. ................. 296/29 |
| 2002/0195840 A1 | * | 12/2002 | Mishima et al. ........ 296/203.01 |
| 2003/0137163 A1 | * | 7/2003 | Hayashi et al. ............. 296/204 |
| 2004/0080188 A1 | * | 4/2004 | Igarashi et al. ......... 296/203.04 |
| 2004/0104601 A1 | * | 6/2004 | Durand ................... 296/203.01 |
| 2004/0108754 A1 | * | 6/2004 | Igarashi et al. ............. 296/204 |

FOREIGN PATENT DOCUMENTS

| | | | | |
|---|---|---|---|---|
| JP | 61006076 A | * | 1/1986 | ................ 296/192 |
| JP | 04293682 A | * | 10/1992 | ............ 296/203.01 |
| JP | 8-142909 | | 6/1996 | |
| JP | 9-118252 | | 5/1997 | |

* cited by examiner

*Primary Examiner*—D. Glenn Dayoan
*Assistant Examiner*—Paul Chenevert
(74) *Attorney, Agent, or Firm*—Smith, Gambrell & Russell, LLP

(57) ABSTRACT

The present invention is to provide a rear structure of a vehicle body that can ensure high body stiffness and suspension stiffness and that can disperse impact load to the whole body. In the rear structure of a vehicle body, a crossmember 20 bridged between right and left rear side frames 1, 5 is approximately an X-shape in plan view having a first crossmember 21 and a second crossmember 22, and at least one of the front ends of the first and second crossmembers and the rear ends of the first and second crossmembers is directly connected to a structure to be equipped with a suspension.

18 Claims, 15 Drawing Sheets

REAR STRUCTURE OF VEHICLE BODY

BACKGROUND OF THE INVENTION

1. Field of the Invention

The present invention relates to a rear structure of a vehicle body, particularly the rear structure ensuring stiffness of the body and stiffness supporting suspension.

2. Description of the Related Art

In a lower structure of a vehicle body positioned in a rear portion of a body of a vehicle, as shown in FIG. 16 illustrating a plan view of the principal portion of the structure, right and left rear side frames 102 whose front portions are each connected to rear portions of right and left side sills 101 extending along right and left sides of the vehicle body and which extend in a body fore-and-aft direction are disposed, and a frontward crossmember 103 and a backward crossmember 104 extending in a width direction of the body are disposed between the right and left rear side frames 102 to form a frame in the form of an approximate ladder.

JP-A-08-142909 describes, at columns 0026 to 0031 and FIG. 1, a rear body structure shown in FIG. 17 illustrating a plan view of a principal portion of the rear body structure. In the rear body structure, a front crossmember 106 and a rear crossmember 107 extending in the width direction of the body are bridged between the front ends of the right and left rear side frames 105 and between the intermediate positions of the frames, respectively, the portions adjacent to the ends of the rear crossmember 107 are connected to the rear side frames 105 through auxiliary members 108. Further, brackets 109 are attached to an approximate triangle area surrounded by these rear side frames 105 and the auxiliary members 108, and shock absorbers 110 of a rear suspension are attached to this bracket 109.

JP-A-09-118252 describes, at columns 0034 to 0039 and FIG. 29, a rear body structure shown in FIG. 18 illustrating a plan view of a principal portion of the rear body structure. In the rear body structure, a front backward crossmember 112 and a rear backward crossmember 113 extending in the width direction of the body are bridged between right and left rear side frames 111, and a central portion of the front rear crossmember 112 is connected to a rear end of a tunnel top reinforce 114 forming a closed cross section extending in a fore-and-aft direction together with a tunnel portion. Further, a pair of diagonal members 115 is disposed between the front backward crossmember 112 and the rear backward crossmember 113 by connecting the front ends of the diagonal members to a connecting portion of the front backward crossmember 112 and the tunnel top reinforce 114 and connecting the rear ends of the diagonal members to the rear portion 111a of the side frame 111.

SUMMARY OF THE INVENTION

According to the lower structure of a vehicle body shown in FIG. 16, the frontward crossmember 103 and the backward crossmember 104 extending in the width direction of the body are bridged between the right and left rear side frames 102, and therefore relative connecting stiffness between the right and left rear side frames 102 can not be sufficiently obtained. Hence, vibration or torsion of the vehicle body generated when the vehicle is running causes relative deformation of the right and left rear side frames 102 as shown in a virtual line of FIG. 16 to occasionally reduce drivability and driving stability.

Further, the frontward crossmember 103 and the backward crossmember 104 extending in the width direction of the body are frequently formed in curved or bent shape to avoid contact with a fuel tank, a suspension member or a spare tire. Thus, in case impact load is applied to the body from its side or its rear, the impact load can not be efficiently dispersed and transmitted from the one of the rear side frames 102 to the other of the frames, whereby it occasionally makes impossible to disperse effectively the impact load to the whole body.

In the rear structure of the body of FIG. 17, stiffness supporting the suspension can be enhanced by attaching the shock absorbers 110 of rear suspension to the brackets 109 attached to an approximate triangle area surrounded by these rear side frames 105, the rear crossmember 107 and the auxiliary members 108. However, vibration or torsion of the vehicle body generated when the vehicle is running causes relative deformation of the right and left rear side frames 105 in the same manner as in FIG. 16 to occasionally reduce operation performance and driving stability. Further, the frontward crossmember 106 and the backward crossmember 107 are extended in the width direction of the body to be disposed between the right and left rear side frames 105, and therefore in case impact load is applied to the body from its side or rear, the impact load can not be efficiently dispersed and transmitted from the one of the rear side frames 105 to the other of the frames 105, whereby it occasionally makes impossible to disperse effectively the impact load throughout the body.

Further, in the rear body structure of FIG. 18, stiffness of the body can be enhanced by disposing the pair of diagonal members 115 between the frontward crossmember 112 and the backward crossmember 113 extending in the width direction of the body and disposed between right and left rear side frames 111. However, the disposition of the frontward crossmember 112, the backward crossmember 113 and the pair of diagonal members 115 therebetween brings about complexation of each of the members and increase of the body weight. Moreover, the frontward crossmember 112, the backward crossmember 113 and the diagonal members 115 each occupy a large area for disposing them to restrict freedom for vehicle body design.

Moreover, to ensure good drivability and driving stability, high suspension-supporting-stiffness for supporting a suspension to body members is required.

Hence, in view of the above-mentioned problems, the object of the present invention is to provide a rear structure of a vehicle body (generally car body) that can ensure high body stiffness and suspension-supporting-stiffness without bringing about complexation of the structure and increase of the body weight, and that can disperse impact load to to the whole body.

The present invention (first invention) to attain the object is provided by a rear structure of a vehicle body provided with right and left rear side frames disposed on right and left sides of the body and extending in the fore-and-aft direction of the body, and crossmembers bridged between the right and left rear side frames;

the crossmembers being approximately an X-shape in plan view and comprising a first crossmember and a second crossmember, the first crossmember having a front end connected to one of the rear side frames and a rear end connected to the other of the rear side frames, and extending in the rear direction of the body from the front end to the rear end while receding from one of the rear side frames, the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;

wherein at least one of the front ends of the first and second crossmembers and the rear ends of the first and second crossmembers is connected to the rear side frames in the vicinity of a structure to be equipped with a suspension.

According to the first invention, the approximately X-shaped crossmembers comprising a first crossmember and a second crossmember are bridged between the right and left rear side frames while at least one of the front ends of the first and second crossmembers and the rear ends of the first and second crossmembers is connected to the rear side frames in vicinity of a structure to be equipped with a suspension. Therefore, the first and second crossmembers suppress relative deformation of the right and left rear side frames to give high stiffness of the rear portion of the body and to enhance stiffness for supporting the suspension. Further, if impact load is applied to the body from its side or its rear, the impact load can be dispersed efficiently from the one of the rear side frames to the other of the frames through the approximately X-shaped crossmembers, whereby the impact load can be dispersed and transmitted to the whole body.

Further, the simple structure obtained by intersecting the first and second crossmembers to bridge between the right and left rear side frames can bring about improvement of the body stiffness and the stiffness for supporting a suspension and reduction of body weight.

The present invention (second invention) to attain the object is provided by a rear structure of a vehicle body provided with a pair of right and left rear side frames disposed on right and left sides of the body and extending in the fore-and-aft direction of the body, and crossmembers bridged between the right and left rear side frames;

the crossmembers being approximately an X-shape in plan view and comprising a first crossmember and a second crossmember, the first crossmember having a front end connected to one of the rear side frames and a rear end connected to the other of the rear side frames, and extending in the rear direction of the body from the front end to the rear end while receding from one of the rear side frames, the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;

wherein at least one of the front ends of the first and second crossmembers and the rear ends of the first and second crossmembers is directly connected to a structure to be equipped with a suspension.

According to the second invention, the approximately X-shaped crossmembers comprising a first crossmember and a second crossmember are bridged between the right and left rear side frames while at least one of the front ends of the first and second crossmembers is directly connected to a structure to be equipped with a suspension. Therefore, the first and second crossmembers suppress relative deformation of the right and left rear side frames to give high stiffness of the rear portion of the body and to enhance stiffness for supporting the suspension. Further, if impact load is applied to the body from its side or its rear, the impact load can be dispersed efficiently from the one of the rear side frames to the other of the frames through the X-shaped crossmembers, whereby the impact load can be dispersed and transmitted to the whole body.

Further, the simple structure obtained by intersecting the first and second crossmembers to bridge between the right and left rear side frames and by directly connecting the first and second crossmembers to a structure to be equipped with a suspension can bring about improvement of the body stiffness and the stiffness for supporting suspension and reduction of body weight.

The preferred embodiment (1) of the first and second inventions is provided by the rear structure of vehicle body wherein the structure to be equipped with a suspension is connected to the crossmember within the rear side frames.

According to the preferred embodiment (1), since the structure to be equipped with a suspension is connected to the crossmember within the rear side frames, the structure can be formed in compact within the rear side frames to reduce the space occupied by the structure whereby freedom for body design is ensured.

The preferred embodiment (2) of the first and second inventions is provided by the rear structure of a vehicle body wherein the structure to be equipped with a suspension is a pipe disposed within the rear side frames and attached to a member of the suspension to support it.

The preferred embodiment (2) is corresponded to an example of the preferred embodiment (1). According to the preferred embodiment (2), since the pipe to be equipped with a suspension is connected and supported to the rear side frames and the member of the suspension, the stiffness for supporting a suspension can be more improved.

The preferred embodiment (3) of the first and second inventions is provided by the rear structure of a vehicle body wherein the vehicle body has right and left C-pillars (rear pillars) extending in the vertical direction of the body, and the front ends of the first and second crossmembers are extended (and disposed) to the lower ends of the C-pillars.

According to the preferred embodiment (3), since the front ends of the first and second crossmembers are extended and disposed to the lower ends of the C-pillars, the connecting stiffness (bonding stiffness) between the lower portion of the body and the C-pillars are greatly improved to enhance stiffness of the body. Further, if impact load is applied to the body from its side or its rear, the impact load can be dispersed and transmitted to the whole lower portion of the body through the right and left rear side frames and the first and second crossmembers and simultaneously dispersed efficiently to the C-pillars, whereby the impact load can be also dispersed to the sides and the upper portion of the body to permit the impact load to efficiently disperse to the whole body.

The preferred embodiment (4) of the first and second inventions is provided by the rear structure of vehicle body wherein the vehicle body has right and left D-pillars (pillars to the rear of C-pillars) extending in the vertical direction of the body, and the rear ends of the first and second crossmembers are extended (and disposed) to the lower ends of the D-pillars to be disposed on the ends.

According to the preferred embodiment (4), because the rear ends of the first and second crossmembers each are extended to the lower ends of the right and left D-pillars, the high connecting stiffness between the lower portion of the body and D-pillars are ensured to greatly improve the stiffness of the body. Further, if impact load is applied to the body from its side or its rear, the impact load can be dispersed and transmitted to the whole lower portion of the body through the right and left rear side frames and the first and second crossmembers and simultaneously dispersed efficiently to the D-pillars, whereby the impact load can be dispersed from the D-pillars to the sides and the upper portion of the body to permit the impact load to efficiently disperse to the whole body.

DETAILED DESCRIPTION OF THE INVENTION

The embodiments of the rear structure of a vehicle body according to the present invention are explained by reference of the drawings.

First Embodiment

Figure 1:
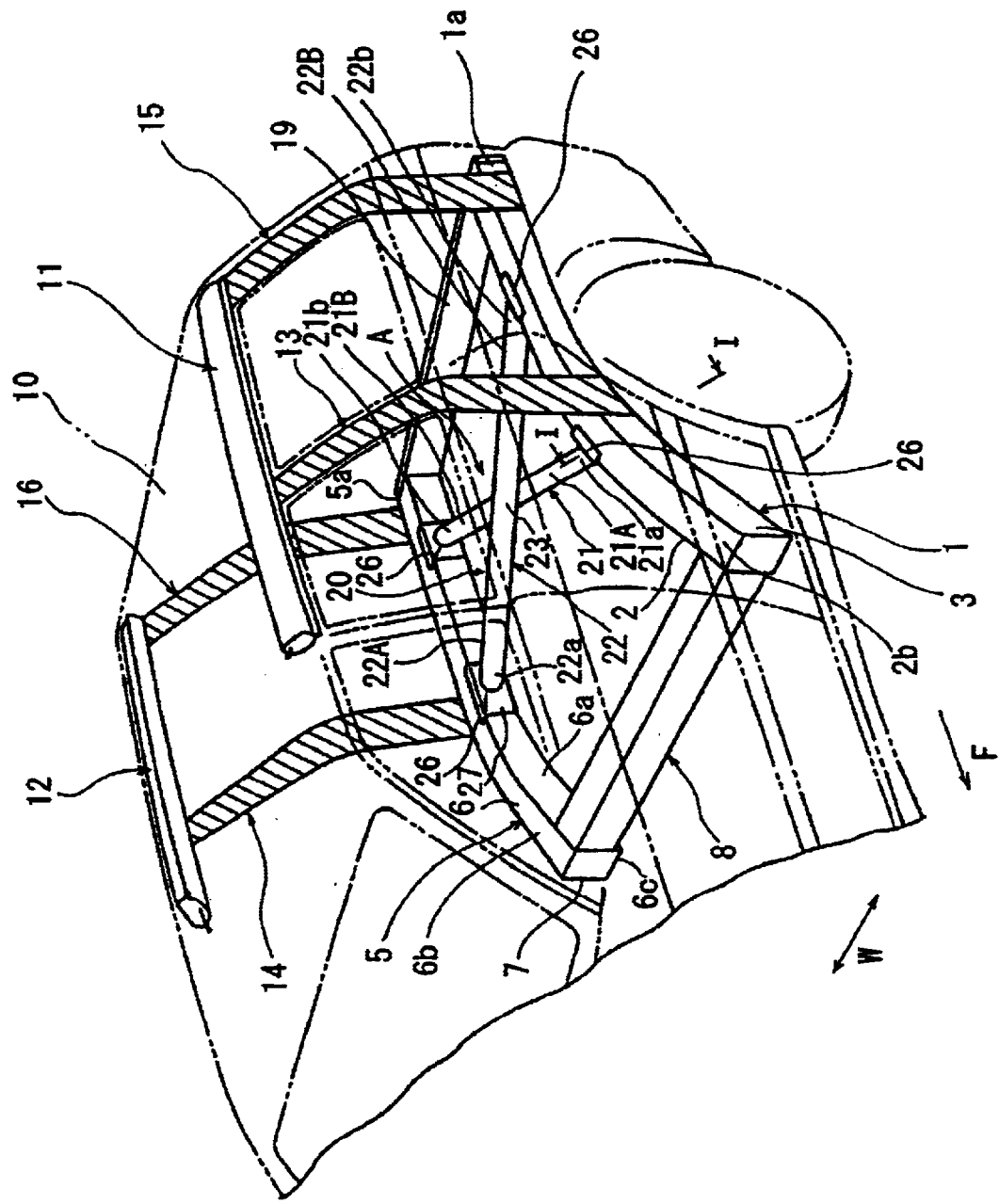
FIG. 1 is a perspective view showing schematically a first embodiment of the rear structure of vehicle body according to the present invention.

FIG. 1 is a perspective view showing schematically a first embodiment of the rear structure of vehicle body according to the present invention. In FIG. 1, an arrow F represents a front of the body and an arrow W represents a width of the body.

Examples of the vehicle (i.e., automobile) include a wagon type automobile in which a passenger room and a luggage room disposed in rear side of the passenger room are incorporated. In the automobile, side sills (not shown) are disposed opposite to each other along the right and left sides of the body in the lower portion of the rear body, and the front portions of the right and left rear side frames 1, 5 extending in the fore-and-aft direction of the body are connected to the rear portions of the side sills, respectively.

Right and left side rails 11, 12 are extended along the both sides of a lower surface of a roof panel 10 on the upper side of the body positioned in the upper side of the rear portion of the vehicle body, while right and left C-pillars 13, 14 extending in a vertical direction along a rear side of an opening of a rear door and right and left D-pillars 15, 16 extending in a vertical direction along a rear end of the body are formed in the right and left sides of the body. Further, the upper ends of the C-pillars 13, 14 are connected directly to the side rails 11, 12, and the lower ends are connected directly to the rear side frames 1, 5 or connected to the frames through floor panels etc. (in FIG. 1, the C-pillars 13, 14 and D-pillars 15, 16 are hatched). The upper ends of the D-pillars 15, 16 are connected to the rear ends of the side rails 11, 12, respectively, while the lower ends of the D-pillars are connected to the rear side frames 1, 5 through the floor panel, a reinforce etc.

Figure 2:
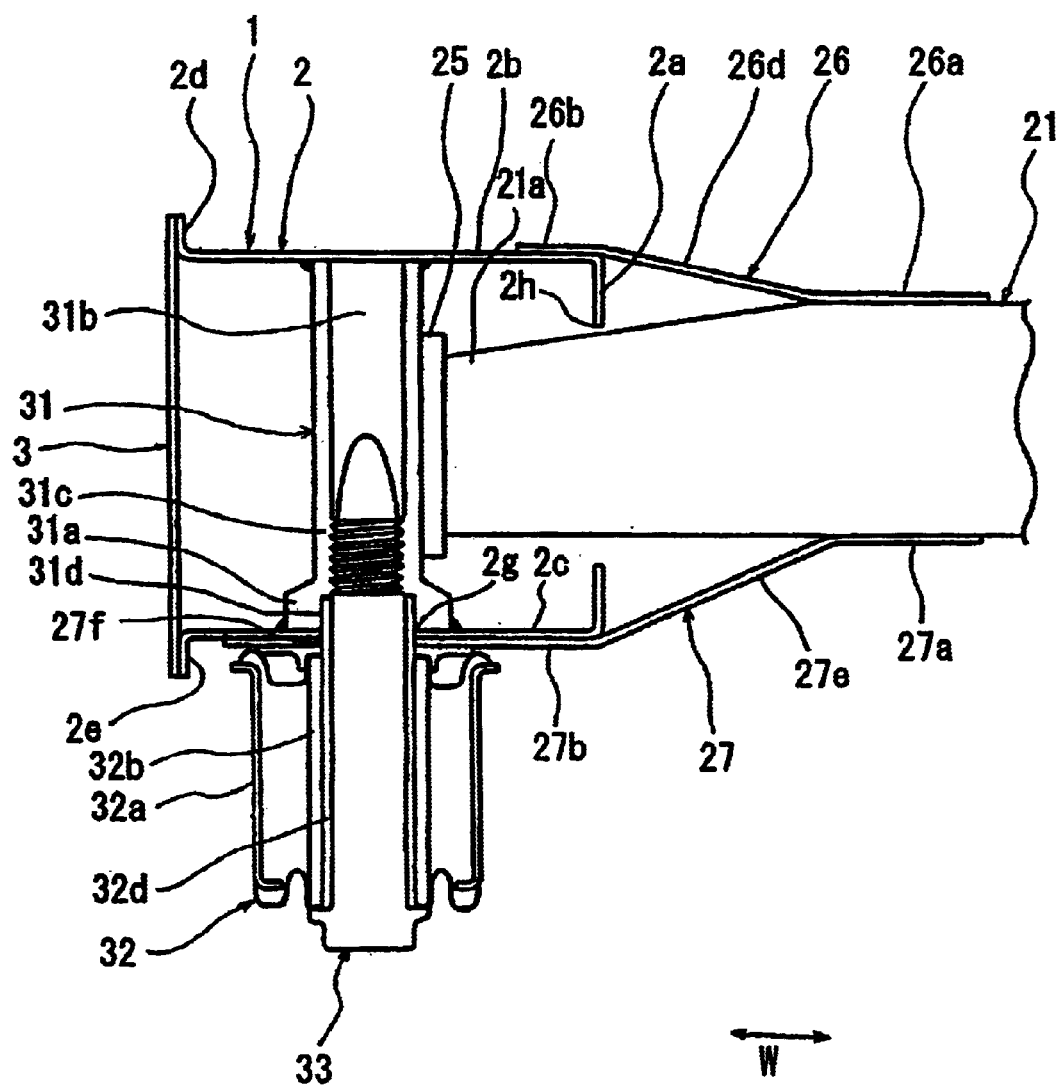
FIG. 2 is a section view taken along I—I line of FIG. 1.

The rear side frame 1 is, as shown in FIG. 2 illustrating a section view taken along I—I line of FIG. 1, has a closed section view in the form of an approximate rectangle (hollow) which is formed from an inner panel 2 and an outer panel 3. The inner panel 2 extends in the fore-and-aft direction in the form of approximate "U" in section view and which has an upper surface 2b and a lower surface 2c bent outwardly in the width direction of the body along an inner surface 2a and its upper and lower edges, and the outer panel 3 is in the form of an approximate plane plate of which upper edge and lower edge are connected to each of flanges 2d, 2e formed by bending outwardly edges of an upper surface 2b and lower surface 2c of an inner panel 2. Further, the rear side frame 5 also has a closed section view in the form of an approximate rectangle (hollow) which extends in the fore-and-aft direction of the body and which is formed from an inner panel 6 bent and formed in the form of approximate "U" in section view having an inner surface 6a, an upper surface 6b and a lower surface 6c, and from the outer panel 7 in the form of plane plate.

The right and left rear side frames 1 and 5 are connected to each other by the front crossmember 8 extending in the width direction of the body, and the rear ends 1a and 5a of the frames are connected to each other by a rear skirt 19 and bumper beam (not shown) extending in the width direction of the body.

Further, a first crossmember 21 is obliquely bridged between the right and left rear side frames 1 and 5. The first crossmember 21 has a front end 21a connected to one rear side frame 1 and a rear end 21b connected to the other rear side frame 5, and extends in the form of linear line in the rear direction of the body with moving from the rear side frame 1 to the rear side frame 5. The second crossmember 22 is also bridged between the right and left rear side frames 1 and 5. The second crossmember 22 has a front end 22a connected to the rear side frame 5 and a rear end 22b connected to the rear side frame 1, and extends in the form of linear line in the rear direction of the body with moving from the rear side frame 1 to the rear side frame 5 to intersect the first crossmember 21 at the middle position of the rear side frame 5.

These first and second crossmembers 21, 22 are in the form of cylinder, and connected each other at an intersecting portion 23 to form a crossmember 20 in the form of "X" in plan view.

Figure 3:
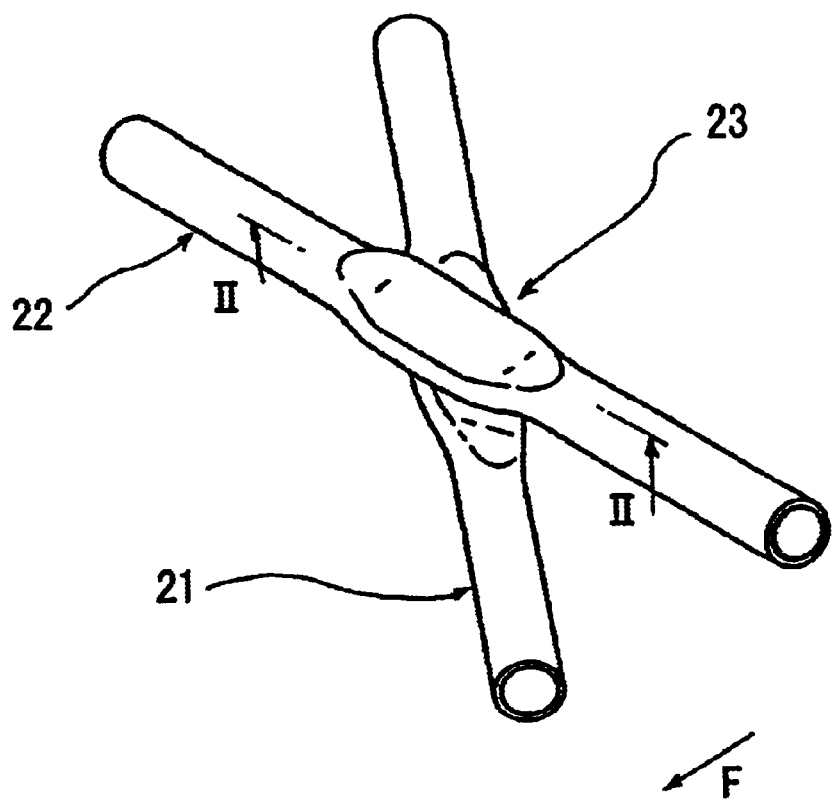
FIG. 3 is a perspective view shown by magnifying A portion of FIG. 1.
Figure 4:
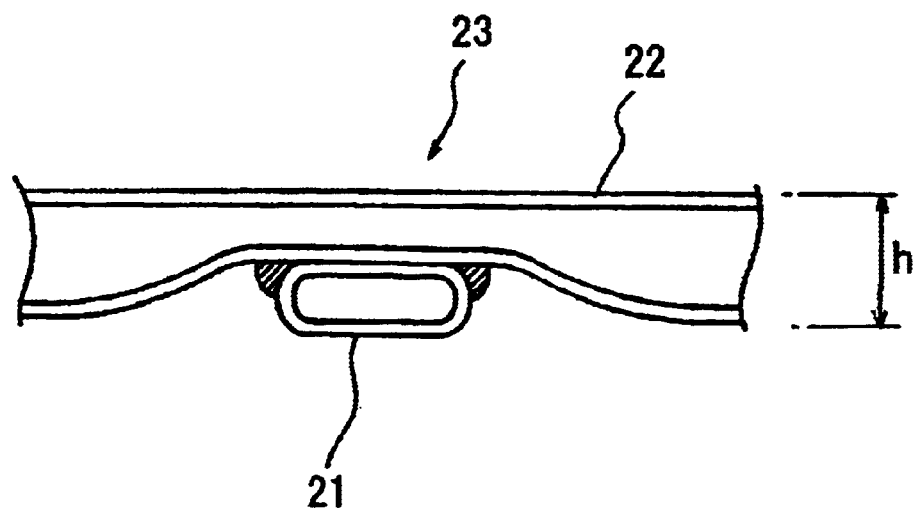
FIG. 4 is a section view taken along II—II line of FIG. 3.

As shown FIG. 3 illustrating a perspective view shown by magnifying A portion of FIG. 1 and FIG. 4 illustrating a section view taken along II—II line of FIG. 3, the intersecting portion 23 is formed by compressing the intersecting portion of the first and second crossmembers 21 and 22 each other in a vertical direction to deform to a plane shape and control height h, and enlarging the intersecting portion contacting each other and then connecting the center portions of the first and second crossmembers 21 and 22 each other with welding.

In other words, a front area 21A and a rear area 21B of the first crossmember 21, and a front area 22A and a rear area 21B of the second crossmember 22 are connected one another by the intersecting portion 23 to form a crossmember 20 in the form of an approximate "X" in plan view, and consequently the crossmember 20 is bridged and connected between the rear side frames 1 and 5.

Figure 5:
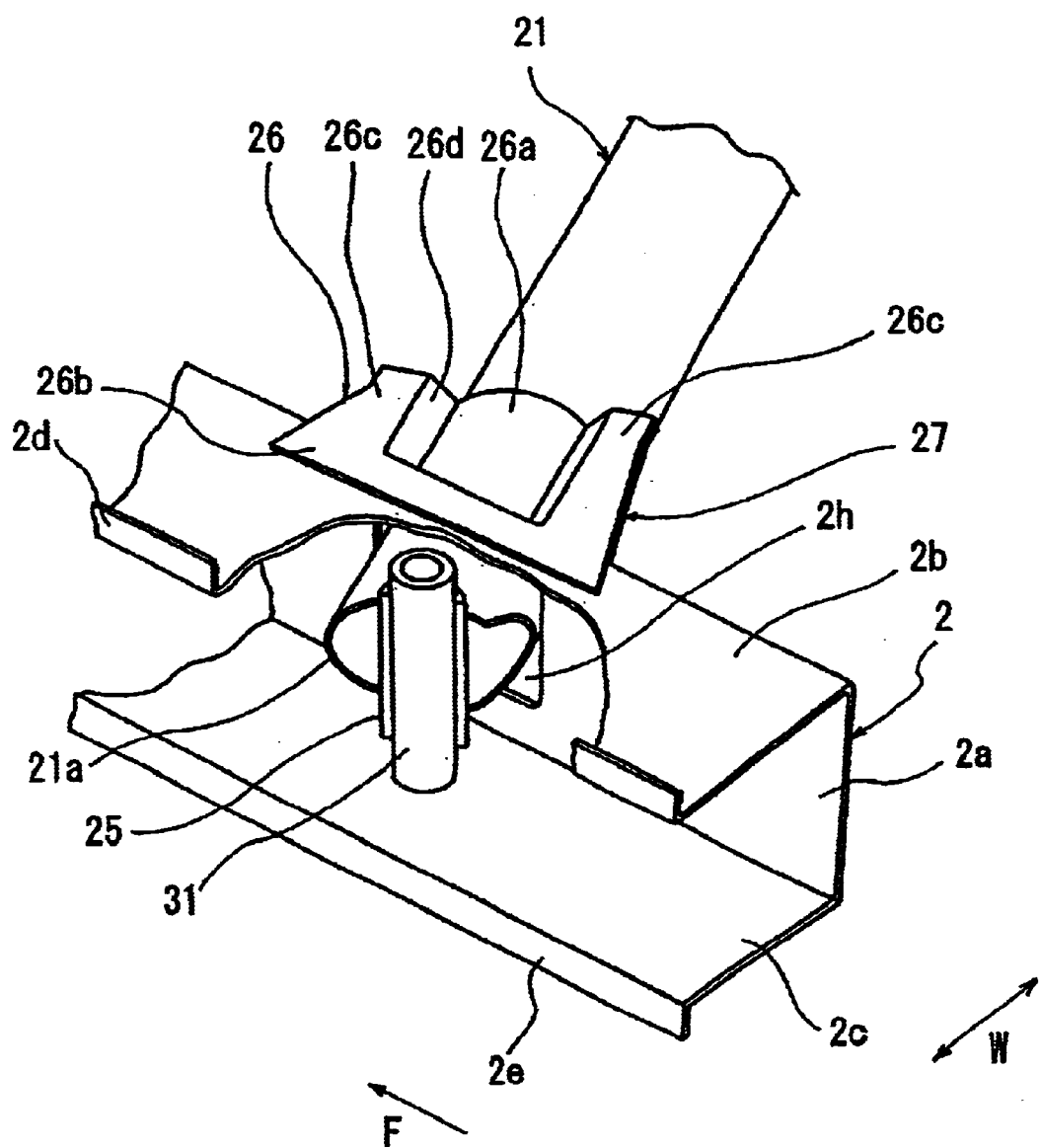
FIG. 5 is a principal perspective view showing the connecting portion between the front end of the first crossmember and the rear side frame.
Figure 6:
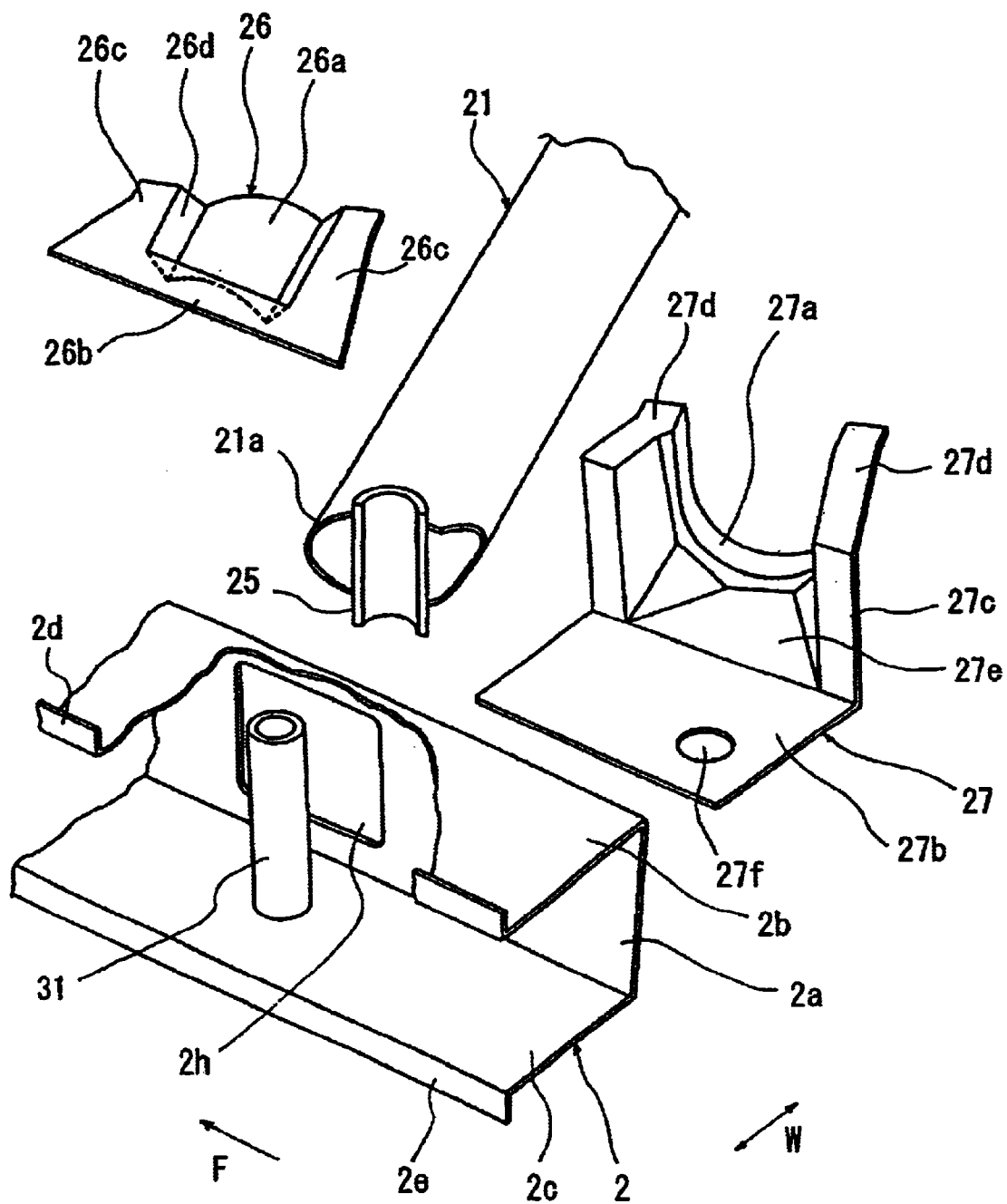
FIG. 6 is an exploded perspective view showing the connecting portion of FIG. 5.

Subsequently, a structure of the connecting portion of the front end 21a of the first crossmember 21 and the rear side frame 1 is explained by reference of FIG. 2 illustrating a section view, FIG. 5 illustrating a principal perspective view of the connecting portion omitting outer panel 3 and FIG. 6 illustrating an exploded perspective view.

A mounting hole 2g for mounting a structure to be equipped with a suspension is perforated on the lower surface 2c of the inner panel 2 of the rear side frame 1 connected to the front end of the first crossmember 21, and an opening 2h in the form of rectangular is formed the inner surface 2a. A pipe 31 mounting and supporting suspension members (mentioned later) and serving as a spacer between the upper surface 2b and the lower surface 2c is extended in a vertical direction and formed so as to be insertable between the upper surface 2b and the lower surface 2c of the rear side frame 1.

On the other hand, a connecting portion 25 of the pipe in the form of semicylinder which can be fitted to a circumference of the pipe 31 and extends in a vertical direction is connected to the front end 21a of the first crossmember 21 by welding, and the front end 21a of the first crossmember 21 connected to the rear side frame 1 by an upper bracket 26 and a lower bracket 27.

The upper bracket 26 has a crossmember connecting portion 26a in the form of circular in section view that is fitted to the upper surface of the front end 21a of the first crossmember 21 from the upper side, a frame connecting portion 26b extending in the a fore-and-aft direction with overlapping a upper surface 2b of the inner panel 2 from the upper side, and a pair of flanges 26c extending from the front and rear ends of the frame connection portion 26b along both sides of the crossmember 26a, respectively. Further these crossmember connecting portion 26a, frame connecting portion 26b and flanges 26c are monolithically formed through a connecting portion 26d.

The lower bracket 27 has a crossmember connecting portion 27a in the form of circular in section view that is fitted to the lower surface of the front end 21a of the first cross member 21 from the lower side, a connecting portion 27b of a lower surface of the frame extending in the a fore-and-aft direction and overlapping a lower surface 2c of the inner panel 2 from the lower side, a pair of connecting portions 27c of an inner surface of the frame bended at the front and rear ends of connecting portion 27b of a lower surface of the frame to extend and overlap the inner surface 2a, and a pair of flanges 27d bent at the upper edges of the connecting portion 27c of a lower surface of the frame to extend and overlap the flanges 26c of the upper bracket 26, and these are monolithically formed through a connecting portion 27e. The mounting hole 27f is perforated on the connecting portion 27b of a lower surface of the frame.

The lower bracket 27 has a crossmember connecting portion 27a in the form of circular in section view that is fitted to the lower surface of the front end 21a of the first cross member 21 from the lower side, a connecting portion 27b of a lower surface of the frame extending in the a fore-and-aft direction and overlapping a lower surface 2c of the inner panel 2 from the lower side, a pair of connecting portions 27c of an inner surface of the frame bended at the front and rear ends of connecting portion 27b of a lower surface of the frame to extend and overlap the inner surface 2a, and a pair of flanges 27d bended at the upper edges of the connecting portion 27c of a lower surface of the frame to extend and overlap the flanges 26c of the upper bracket 26, and these are monolithically formed through a connecting The above connecting portions are each carried out by first inserting the pipe 31 between the upper surface 2b and lower surface 2c of the inner panel 2 of the rear side frame 1 such that the location of the pipe 31 is corresponded to that of the mounting hole 2g to be subjected to making the positioning, and then welding the pipe 31 to the upper surface 2b and lower surface 2c of the inner panel 2 and welding a pipe connecting portion 25 to the front end of the first crossmember 21.

The front end 21a of the first crossmember provided with the pipe connecting portion 25 is inserted into the inner panel 2 from the opening 2h formed on the inner surface 2a of the inner panel 2 to fit the pipe connecting portion 25 to the pipe 31 and simultaneously welding the pipe connecting portion 25 and the pipe 31 to each other.

Subsequently, the crossmember connecting portion 26a and the frame connecting portion 26b of the upper bracket 26 are piled and fitted to the upper surface of the front end 21a of the first crossmember 21 and the upper surface 2b of the inner panel 2 from the upper side, respectively, and the crossmember connecting portion 26a is welded to the upper surface of the first crossmember 21 and simultaneously the frame connecting portion 26b is welded to the upper surface 2b of the inner panel 2. Similarly, the crossmember connecting portion 27a of the lower bracket 27, the connecting portion 27b of a lower surface of the frame, the connecting portion 27c of an inner surface of the frame and the flange 27d are piled and fitted to the lower surface of the front end 21a of the first crossmember 21, the lower surface 2c and the inner surface 2a of the inner panel 2 and the flange 26c of the upper bracket 26 from the lower side, respectively, and the positioning of the mounting hole 27f and the mounting hole 2g perforated on the lower surface 2c of the inner panel 2 is made, and then the crossmember connecting portion 27a is welded to the lower surface of the first crossmember 21, the connecting portion 27b of a lower surface of the frame and the connecting portion 27c of an inner surface of the frame are welded to the lower surface 2c and inner surface 2a of the inner panel 2, respectively, and simultaneously the flange 26c of the upper bracket 26 and the flange 27d of the lower bracket 27 are welded to each other.

Although detailed explanation is not described, similarly, the rear end 21b of the first crossmember 21 and the front end 22a and rear end 22b of the second crossmember 22 are connected to the inner panel 2, 6 of the rear side frames 1, 5 through the upper bracket 26 and lower bracket 27, respectively, and the pipe connecting portions welded to the rear end 21b, the front end 22a and the rear end 22b are welded to the pipe.

Thereafter, the upper edge and lower edge of the outer panel 3 are welded to the flanges 2d, 2e of the inner panel to form the rear side frame 1 in the form of closed cross section (hollow). Similarly, the inner panel 6 and outer panel 7 form the rear side frame 5 in the form of closed cross section (hollow).

A structure for mounting a suspension including a pipe 31 provided in the rear side frames 1 and 5 is explained by reference of FIG. 2 illustrating a section view.

The pipe 31, which disposed in the inner panel 2 of the rear side frame 1 by connecting to the front end 21a of the first crossmember 21, has a flange 31a formed on its lower end, and a screw portion 31c and spacer-fitting portion 31d formed on a lower portion of a through hole 31b and is in the form of tube. The pipe 31 is welded such that the upper end and lower end are in contact with the upper surface 2b and lower surface 2c of the inner panel 2, respectively.

A bushing 32 is provided with an outer pipe 32a and an inner pipe 32b to which are connected to various arm members of the suspension, elastic members 32c disposed between these pipes and a pipe-shaped spacer 32d to which is connected to the inside of the inner pipe 32b and of which upper end is capable of fitting to a spacer fitting portion 31d. The bushing 32 is mounted on a lower surface of the rear side frame I by a mounting bolt 33 screwed to a screw mounting portion 31c which is inserted in the spacer 32d from the lower side to pass through a mounting hole 27f of the under bracket 27 and a mounting hole 2g of the lower surface 2c and is consequently formed in a through hole 31b of the pipe 31. Similarly, various arm members are supported on the rear end 21b of the first crossmember 21, the front end 22a and the rear end 22b of the second crossmember 22, and the connecting portion of the rear side frames 1, 5 by the structure for supporting a suspension, whereby rear suspensions for supporting rear wheels are mounted.

By adopting the above-mentioned structure, load and vibration applied to the bushing 32 from the rear wheels through the suspensions during driving are transmitted to the pipe 31 from the bushing 32 through the mounting bolt 33 to be dispersed from the whole rear side frame 1. Simultaneously a part of the load and vibration is transmitted from the pipe 31 to the front end 21a of the first crossmember 21 and further transmitted from the rear end 21b to the other rear side frame 5 through the first crossmember, while the part is also dispersed from the intersecting portion 23 to the second crossmember 22, from the front end 22a of the second crossmember 22 to the rear side frame 5, and from the rear end 22b to the rear side frame 1, whereby it can be efficiently transmitted and dispersed throughout the rear portion of the body. Similarly, load and vibration applied from the suspensions are transmitted and dispersed to the rear end 21b of the first crossmember 21, the front end 22a and rear end 22b of the second crossmember 22 and the connecting portion of the rear side frames 1, 5 through the rear side frames 1, 5 and the first and second crossmembers 21, 22, whereby the load and vibration can be efficiently transmitted and dispersed throughout the rear portion of the body to ensure high stiffness for supporting the rear suspensions.

Subsequently, the rear structure of a vehicle body formed in the above manner is explained on its action.

In case impact load and vibration from the suspension members caused by driving bring about deformation in torsion of the body, counterforce (reaction) to the tension or compression caused by the impact load and vibration is generated in the first and second crossmembers 21, 22 obliquely intersected and bridged between the right and left rear side frames 1 and 5. The resultant counterforce depresses the relative deformation of the right and left rear side frames 1, 5 to greatly enhance stiffness of the body such as stiffness in torsion of a whole body. Further, the enhanced stiffness of the rear body can ensure high stiffness of the whole body.

Further, since the pipe 31 for attaching the suspension members to the rear side frames 1, 5 and supporting them is connected to the rear side frame 1 and the front end 21a of the first crossmember 21, impact load and vibration applied from the suspension member to the pipe 31 during driving are dispersed to the front and back of the body by the rear side frame 1 provided with the pipe 31, and simultaneously dispersed and transmitted from the rear end 21b to the other rear side frame 5 through the first crossmember 21, and from the front end 22a of the second crossmember 22 connected crosswise to the first crossmember 21 to the rear side frame 5 through the second crossmember 22, and further from the rear end 22b to the rear side frame 1 whereby the impact load and vibration are efficiently dispersed and transmitted throughout the rear portion of the body. Similarly, impact load and vibration applied to the pipe 31 from other suspension members are also sufficiently dispersed to the whole rear portion of the body through the rear side frames 1, 5, the first crossmember 21 and the second crossmember 22. Hence, impact load and vibration applied to the pipe 31 from the suspension members during driving are sufficiently dispersed to the whole rear portion of the body by the right and left rear side frames 1, 5 and the first and second crossmembers 21, 22 whereby high stiffness for supporting the suspension is ensured to improve drivability and driving stability of vehicle.

Figure 7:
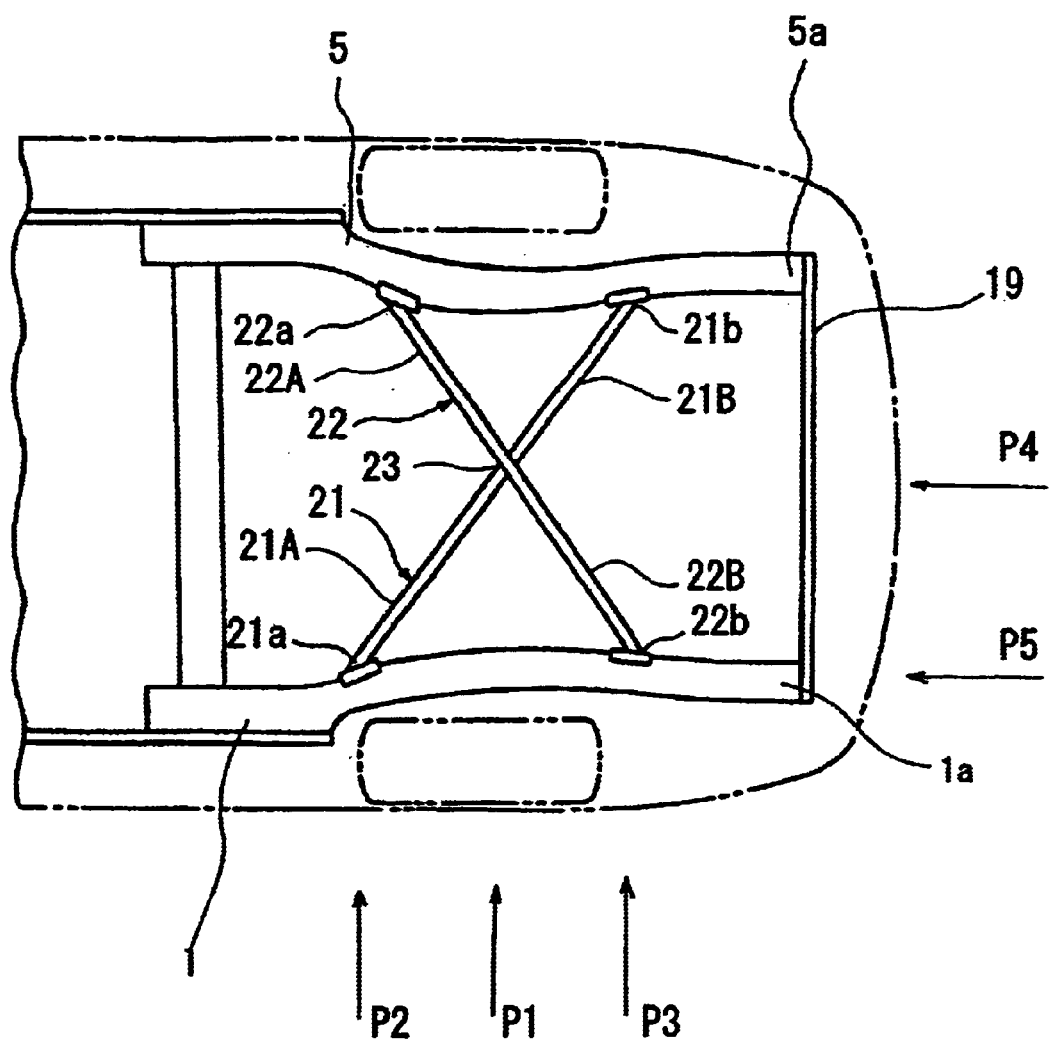
FIG. 7 is a plan view showing schematically the rear structure of a vehicle body.

As shown in FIG. 7, in case impact load given from the side of the body, e.g., impact load P1 is applied to a whole surface of the rear portion of the body, or an interval between the connecting portion of the rear side frame 1 and the front end 21a of the first crossmember 21 and the connecting portion of the rear side frame 1 and the rear end 22b of the second crossmember 22, the impact load P1 is transmitted and dispersed to a wide area of the vehicle body in the fore-and-aft direction of the body through the rear side frame 1, and simultaneously a part of the impact load P1 is dispersed to the front end 21a of the first crossmember 21 and the rear end 22b of the second crossmember 22 through the rear side frame 1 to be applied to them.

The impact load applied at the front end 21a of the first crossmember is transmitted from the rear end 21b of the first crossmember 21 to the other rear side frame 5 through the first crossmember 21, and a part of the impact load is dispersed from the intersecting portion 23 to the front area 22A of the second crossmember 22 and further transmitted from the front end 22a to the rear side frame 5, whereby the impact load is dispersed to a wide area of the rear side frame 5. On the other hand, the impact load applied to the rear end 22b of the second crossmember 22 is transmitted from the front end 22a of the second crossmember 22 to the other rear side frame 5 through the second crossmember 22, and a part of the impact load is dispersed from the intersecting portion 23 to the rear area 21B of the first crossmember 21 and further transmitted from the rear end 21b to the rear side frame 5, whereby the impact load is dispersed to a wide area of the rear side frame 5.

Hence, the impact load P1 is dispersed from the right and left rear side frames 1, 5 and the first and second crossmember 21, 22 to the whole rear portion of the body to be efficiently absorbed by the whole rear portion, whereby impact to the passenger can be relaxed to ensure safe of the passenger.

In case impact load P2 is applied from the side of the vehicle body to the vicinity of the connecting portion of the rear side frame 1 and the front end 21*a* of the first crossmember 11, the impact load P2 is transmitted and dispersed to a wide area of the vehicle body in the fore-and-aft direction of the body through the rear side frame 1, and mainly dispersed and transmitted from the rear side frame 1 to the front end 21*a* of the first crossmember 21.

In this case, the impact load applied to the front end 21*a* of the first crossmember 21 is transmitted from the rear end 21*b* of the crossmember 21 to the other rear side frame 5 through the first crossmember 21, and simultaneously a part of the impact load is dispersed from the intersecting portion 23 to the front area 22A of the second crossmember 22 and further transmitted from the front end 22*a* to the rear side frame 5. Further, the part is dispersed to the rear area 22B of the second crossmember 22 and further transmitted from the rear end 22*b* to the rear side frame 1.

Hence, the impact load P2 is dispersed from the right and left rear side frames 1, 5 and the first and second crossmembers 21, 22 to the whole rear portion of the body to be efficiently absorbed by the whole rear portion.

Further, in case impact load P3 is applied from the side of the vehicle body to the vicinity of the connecting portion of the rear side frame 1 and the rear end 22*b* of the second crossmember 22, the impact load P3 is transmitted and dispersed to a wide area of the vehicle body in the fore-and-aft direction of the body through the rear side frame 1, and mainly dispersed and transmitted from the rear side frame 1 to the rear end 22*b* of the second crossmember 22.

In this case, the impact load applied to the rear end 22*b* of the second crossmember 22 is transmitted from the front end 22*a* of the second crossmember 22 to the other rear side frame 5 through the second crossmember 22, and simultaneously a part of the impact load is dispersed from the intersecting portion 23 to the rear area 21B of the first crossmember 21 and further transmitted from the rear end 21*b* of the rear area 21B to the rear side frame 5, whereby the part is dispersed and transmitted to the wide area of the rear side frame 5. Further, the part is dispersed to the front area 21A of the first crossmember 21 and further transmitted from the front end 21*a* to the rear side frame 1.

Hence, the impact load P3 is dispersed from the right and left rear side frames 1, 5 and the first and second crossmembers 21, 22 to the whole rear portion of the body to be efficiently absorbed by the whole rear portion.

In case a relatively little impact load P4 is applied to a central portion of the body in the width direction or the whole body from the back side, the impact load P4 is dispersed and transmitted to the right and left rear side frame 1, 5 and the rear ends 1*a*, 5*a* through the rear skirt 19, the bumper beam etc. Since the impact load is efficiently dispersed to the right and left rear side frames 1, 5, this dispersion (transmission) of the impact load to the right and left rear side frames 1, 5 prevents generation of the phenomenon (referred to as frame opening) in which the rear ends 1*a*, 5*a* of the right and left rear side frames 1, 5 are part from each other due to the connection of the rear ends 1*a*, 5*a* and the rear skirt 19, the bumper beam etc.

The impact load applied to the rear end 1 a of the rear side frame 1 is dispersed and transmitted from the rear side frame 1 to the side sill to which the front area of the rear side frame 1 is connected and the rear end 22*b* of the second crossmember 22. The impact load applied to the rear end 22*b* is transmitted from the front end 22*a* of the second crossmember 22 to the rear side frame 5 through the second crossmember 22, and simultaneously a part of the impact load is dispersed from the intersecting portion 23 to the rear area 21B of the first crossmember and then dispersed from the rear end 21*b* of the rear area 21B to the rear side frame 5, whereby the impact load is dispersed and transmitted to the wide area of the rear side frame 5. The part of the impact load is also dispersed from the intersecting portion 23 to the front area 21A of the first crossmember 21, and then dispersed from the front end 22*a* 21*a* of the front area 21A to the rear side frame 1.

On the other hand, the impact load applied to the rear end 5*a* of the rear side frame 5 is dispersed and transmitted from the rear side frame 5 to the side sill to which the front area of the rear side frame 5 is connected and the rear end 21*b* of the first crossmember 21. The impact load transmitted to the rear end 21*b* is transmitted from the front end 21*a* of the first crossmember 21 to the rear side frame 1 through the first crossmember 21, and simultaneously a part of the impact load is dispersed from the intersecting portion 23 to the rear area 22B of the second crossmember 22 and then dispersed from the rear end 22*b* of the rear area 22B to the rear side frame 1, whereby the impact load is dispersed to the wide area of the rear side frame 1. The part of the impact load is also dispersed from the intersecting portion 23 to the front area 22A of the second crossmember 22, and then dispersed from the front end 22*a* of the front area 22A to the rear side frame 5.

Hence, the impact load P4 is dispersed to the whole body through the right and left rear side frames 1, 5 and the first and second crossmembers 21, 22 to be efficiently absorbed by the whole body.

In case an excess impact load P4 is applied to a central portion of the body in the width direction or the whole body, the impact load P4 is dispersed and transmitted to the right and left rear side frames 1, 5 and the rear ends 1*a*, 5*a* through the rear skirt 19, the bumper beam etc. This impact load applied dispersedly to the right and left rear side frames 1, 5 is efficiently dispersed and transmitted to the rear side frames 1, 5 and then dispersed to the whole body through the rear side frames 1, 5, the first crossmember 21, the second crossmember 22, etc. because the rear ends 1*a*, 5*a* of the right and left rear side frames 1, 5 are connected to each other by the rear skirt 19, the bumper beam etc. whereby generation of the frame opening is prevented.

In this case, the impact load remains partially without being dispersed and transmitted to the whole body. The remaining impact load causes collapsing deformation of the rear side frame 1 to be absorbed. In this case, the area of the rear side frame 1 in which the approximately X-shaped crossmember 20 is provided is set such that stiffness (i.e., counter force) against load in the fore-and-aft direction is ensured by the first and second crossmembers 21 and 22 while stiffness in the rear area protruded more rearwardly than this crossmember 20 is relatively low. Therefore, the impact load applied to the rear end 1*a* of the rear side frame 1 depresses the rear area of the rear side frame 1 whereby the impact load is absorbed. Similarly, the area of the rear side frame 5 in which the approximately Xshaped crossmember 20 is provided is set such that stiffness, to load in the fore-and-aft direction is ensured by the first and second crossmembers 21 and 22 while stiffness in the rear area protruded more rearwardly than this crossmember 20 is relatively low, and therefore, the impact load applied to the rear end 5a of the rear side frame 5 depresses the rear area of the rear side frame 5 whereby the impact load is absorbed.

Hence, when an excess impact load P4 is applied to a central portion of the body in the width direction or the whole body from the back side, the rear areas of the rear side frames 1 and 5 are effectively utilized as crash stroke, i.e., the impact load is efficiently absorbed by smooth collapsing deformation of the rear side frames 1, 5 whereby relaxation of the impact loads is brought about to ensure safety of crews of vehicle.

Further, in case a relative little impact load is offset in one side of width direction of the body, for example impact load P5 offset in the side of the rear side frame 1, is applied from the back side, the impact load P5 is mainly applied to the rear end 1a of the rear side frame 1 and simultaneously a part of the impact load P5 is dispersed and transmitted to the rear end 5a of the rear side frame 5 through the rear skirt 19, bumper beam, etc.

The impact load applied to the rear end 1a of the rear side frame 1 is dispersed and transmitted from the rear side frame 1 to the side sill to which the front portion of the rear side frame 1 is connected and the rear end 22b of the second crossmember 22. The impact load transmitted to the rear end 22b of the second crossmember 22 is transmitted from the front end 22a of the second crossmember 22 to the rear side frame 5 through the second crossmember 22, and simultaneously a part of the impact load is dispersed from the intersecting portion 23 to the rear area 21B of the first crossmember, and also transmitted from the rear end 21b to the rear side frame 5 whereby the impact load is transmitted to the wide area of the rear side frame 5. Also, the part is dispersed from the intersecting portion 23 to the front area 21A of the first crossmember 21 and then dispersed from the front end 21a to the rear side frame 1.

On the other hand, the impact load applied to the rear end 5a of the rear side frame 5 is dispersed and transmitted from the rear side frame 5 to the side sill to which the front portion of the rear side frame 5 is connected and the rear end 21b of the first crossmember 21. The impact load transmitted to the rear end 21b of the first crossmember 21 is transmitted from the front end 21a of the first crossmember 21 to the rear side frame 1 through the first crossmember 21, and simultaneously a part of the impact load is dispersed from the intersecting portion 23 to the rear area 22B of the second crossmember 22, and also transmitted from the rear end 22b to the rear side frame 1 whereby the impact load is transmitted to the wide area of the rear side frame 1. Also, the part is dispersed from the intersecting portion 23 to the front area 22A of the second crossmember 22 and then dispersed from the front end 22a to the rear side frame 5. Hence, the impact load P5 is efficiently dispersed to the whole body through the right and left rear side frames 1, 5 and the first and second crossmembers 21, 22 to be absorbed by the whole body.

Further, in case impact load P5 offset and applied to the side of the rear side frame 1 from the back side is excess, the impact load P5 is mainly applied to the rear end 1a of the rear side frame 1 and simultaneously a part of the impact load P5 is dispersed and transmitted to the rear end 5a of the rear side frame 5 through the rear skirt 19, bumper beam, etc. The impact load applied to the rear end 1a of the rear side frame 1 is dispersed and transmitted from the rear side frame 1 to the side sill to which the front portion of the rear side frame 1 is connected and the rear end 22b of the second crossmember 22, and then dispersed and transmitted to the rear side frames 1 and 5 with the rear ends 1a, 5a of the right and left rear side frames 1, 5 being connected to each other by the rear skirt 19, the bumper beam etc. to prevent generation of the frame opening, whereby the impact load is dispersed to the whole body through the right and left rear side frames 1, 5, the first and second crossmembers 21, 22.

The impact load applied to the rear side frame 1 remains partially without being dispersed and transmitted to the whole body. The remaining impact load causes collapsing deformation of the rear side frame 1 to be absorbed. In this case, the area of the rear side frame 1 in which the approximately X-shaped crossmember 20 is provided is set such that stiffness against load in the fore-and-aft direction is ensured by the first and second crossmembers 21 and 22 while stiffness in the rear area is relatively low. Therefore, the impact load applied to the rear end 1a of the rear side frame 1 depresses the rear area of the rear side frame 1 whereby the impact load is absorbed.

Hence, when an excess impact load P5 is offset and applied to the side of the rear side frame 1, the impact load P5 is mainly absorbed by smooth collapsing deformation of the rear area of the rear side frame 1, and simultaneously the impact load P5 is also dispersed and transmitted to the other rear side frame 5 through the rear skirt 9, bumper beam, etc. to be absorbed by collapsing deformation of the rear area of the rear side frame 5, whereby relaxation of the impact loads is brought about to ensure safety of crews of vehicle.

Similarly, the area of the rear side frame 5 in which the approximately X-shaped crossmember 20 is provided is set such that stiffness against load in the fore-and-aft direction is ensured by the first and second crossmembers 21 and 22 while stiffness in the rear area at the rearward of the crossmember 20 is relatively low. Therefore, the impact load applied to the rear end 5a of the rear side frame 5 depresses the rear area of the rear side frame 5 whereby the impact load is absorbed.

Hence, when an excess impact load P5 is offset and applied to the side of the rear side frame 1 or 5 from the back side, the rear areas of the rear side frames 1 and 5 are effectively utilized as crash stroke, i.e., the impact load is efficiently absorbed by smooth collapsing deformation of the rear side frames 1, 5, whereby relaxation of the impact loads is brought about to ensure safety of crews of vehicle.

According to the rear structure of vehicle body of the embodiment, thus, by disposing the approximately X-shaped crossmember 20 is between the right and left rear side frames 1, 5, relative deformation between the right and left rear side frames 1, 5 due to impact load or vibration brought out from suspension during driving is suppressed to ensure high stiffness of the whole body. Further stiffness for supporting the suspension can be also obtained to ensure drivability and driving stability. Also, in case impact load is applied to the body from its side or its back side, the impact load is efficiently dispersed and transmitted to the whole body to relax the impact against the crews ensuring safety of the crews.

Further, a simple structure of the crossmember 20 approximately in the form of "X" in plan view that is obtained by the first and second crossmembers 21 and 22 being bridged crosswise between the right and left rear side frames 1, 5 ensures high stiffness of the body without increase of the body weight. Moreover, the crossmember 20 obtained by disposing crosswise the first and second crossmembers 21 and 22 is compact, and therefore the crossmember 20 occupies a little space to facilitate arrangement of a fuel tank or a part for mounting a spare tire, whereby freedom of body design can be ensured. Furthermore, the pipe 31 for mounting and supporting the suspension members are connected to the crossmember 20 in the rear side frames 1, 5, and hence this connecting portion can be arranged and compactly mounted within the rear side frames 1, 5. Thus, the space occupied by the connecting portion can be reduced to ensure freedom of body design.

Figure 8:
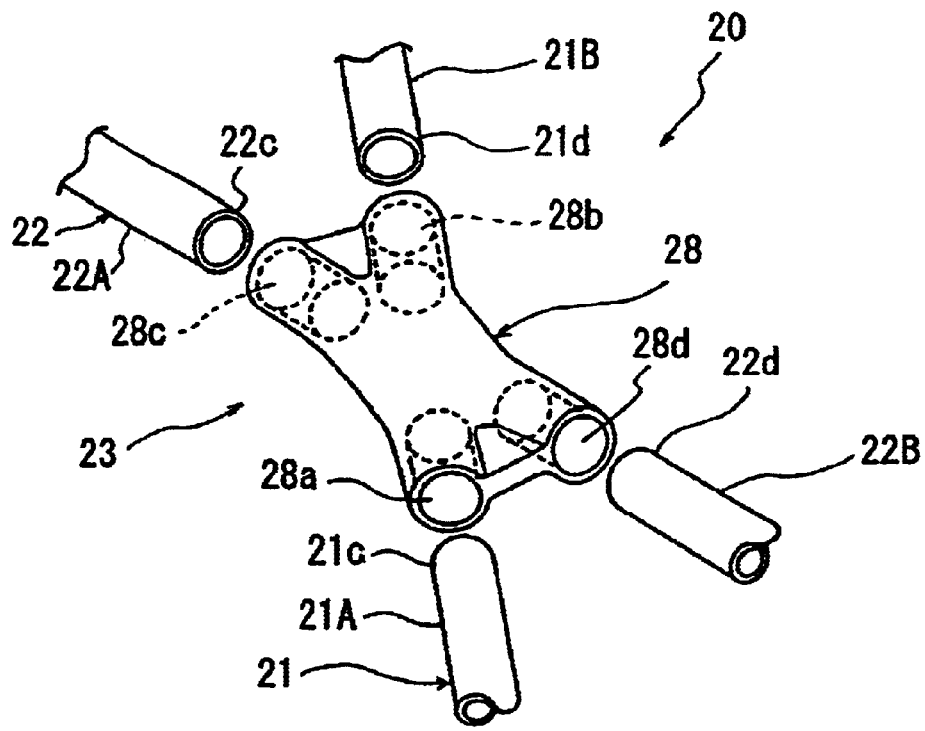
FIG. 8 is a view for explaining the intersecting portion of the first and second crossmembers.

In the explanation above, the intersecting portion in which the first crossmember 21 and the second crossmember 22 are connected each other is formed by deforming the center portions, in which the first crossmember 21 and the second crossmember 22 are intersected each other, so as to be on one plane and welding the center portions. However, the crossmember 20 can be also formed as shown in FIG. 8 illustrating a perspective view, i.e., the first crossmember 21 is cut to the front area 21A and the rear area 21B and the second crossmember 22 is cut to the front area 22A and the rear area 22B, and then the rear end 21c of the front area 21A and the front end 21d of the rear area 21B of the first crossmember 21, and the rear end 22c of the front area 22A and the front end 22d of the rear area 22B of the second crossmember 22 are fitted to inserting holes 28a, 28b, 28c, 28d of a cast-metal joint 28, respectively to be welded, whereby the approximately X-shaped crossmember 20 monolithically connected one another is formed.

Figure 9:
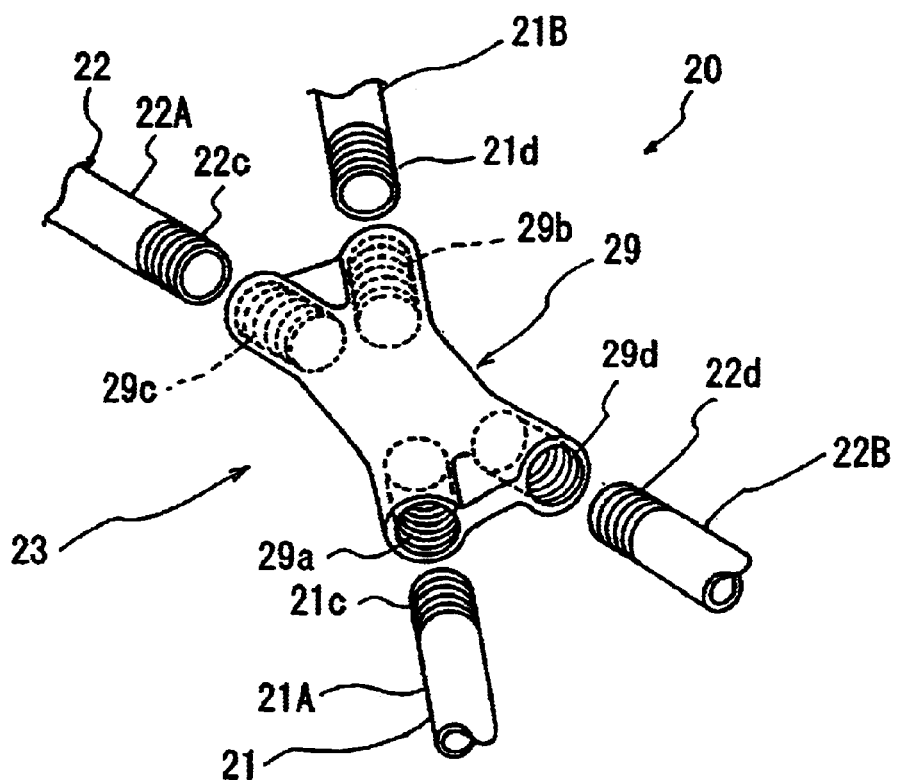
FIG. 9 is a view for explaining the intersecting portion of the first and second crossmembers.

Further, the crossmember 20 can be also formed as shown in FIG. 9 illustrating a perspective view, i.e., the first crossmember 21 is cut to the front area 21A and the rear area 21B and the second crossmember 22 is also cut to the front area 22A and the rear area 22B, and simultaneously a screw portion is formed on the rear end 21c of the front area 21A and the front end 21d of the rear area 21B of the first crossmember 21, and the rear end 22c of the front area 22A and the front end 22d of the rear area 22B of the second crossmember 22, and then the screw portions of the rear end 21c of the front area 21A and the front end 21d of the rear area 21B of the first crossmember 21, and the rear end 22c of the front area 22A and the front end 22d of the rear area 22B of the second crossmember 22 are screwed into screw holes 29a, 29b, 29c, 29d of a cast-metal joint 29, respectively to be welded, whereby the approximately X-shaped crossmember 20 monolithically connected one another is formed.

According to these structures, the front area 21A and rear area 21B of the first crossmember 21, and the front area 22A and rear area 22B of the second crossmember 22 are connected to each other through the cast-metal joint 28 or 29 whereby the intersecting portion 23 of the first crossmember 21 and the second crossmember 22 is improved in its connecting stiffness to provide the crossmember 20 improved in stiffness.

In the explanation above, the front end 21a and the rear end 21b of the first crossmember 21, and the front end 22a and rear end 22b of the second crossmember 22 are connected to the right and left rear side frames 1, 5. However, the following structure can be adopted; i.e., the front end 21a of the first crossmember 21 is extended to the lower end of C-pillar 13, similarly, the rear end 21b to the lower end of the D-pillar 16, the front end 22a of the second crossmember 22 to the lower end of the C-pillar 14, and the rear end 22b to the lower end of the D-pillar 15, respectively, whereby connecting stiffness between the front end 21a of the first crossmember 21 and C-pillar 13, that between the rear end 21b and D-pillar 16, that between the front end 22a of the crossmember 22 and C-pillar 14 and that between the rear end 22b and D-pillar 15 are enhanced to further improve the stiffness of the rear portion of the body, and simultaneously it is also possible that the impact load applied from the side or the back side of the body is transmitted to the side and the upper side of the body through C-pillar 13, 14 and D-pillar 15, 16 to be efficiently dispersed to the whole body.

Second Embodiment

The second embodiment is explained by reference of FIG. 10 to FIG. 13. In FIG. 10 to FIG. 13, parts corresponding to FIG. 1 to FIG. 9 are given the same reference numbers as in FIG. 1 to FIG. 9 to omit the detailed description of the parts.

Figure 10:
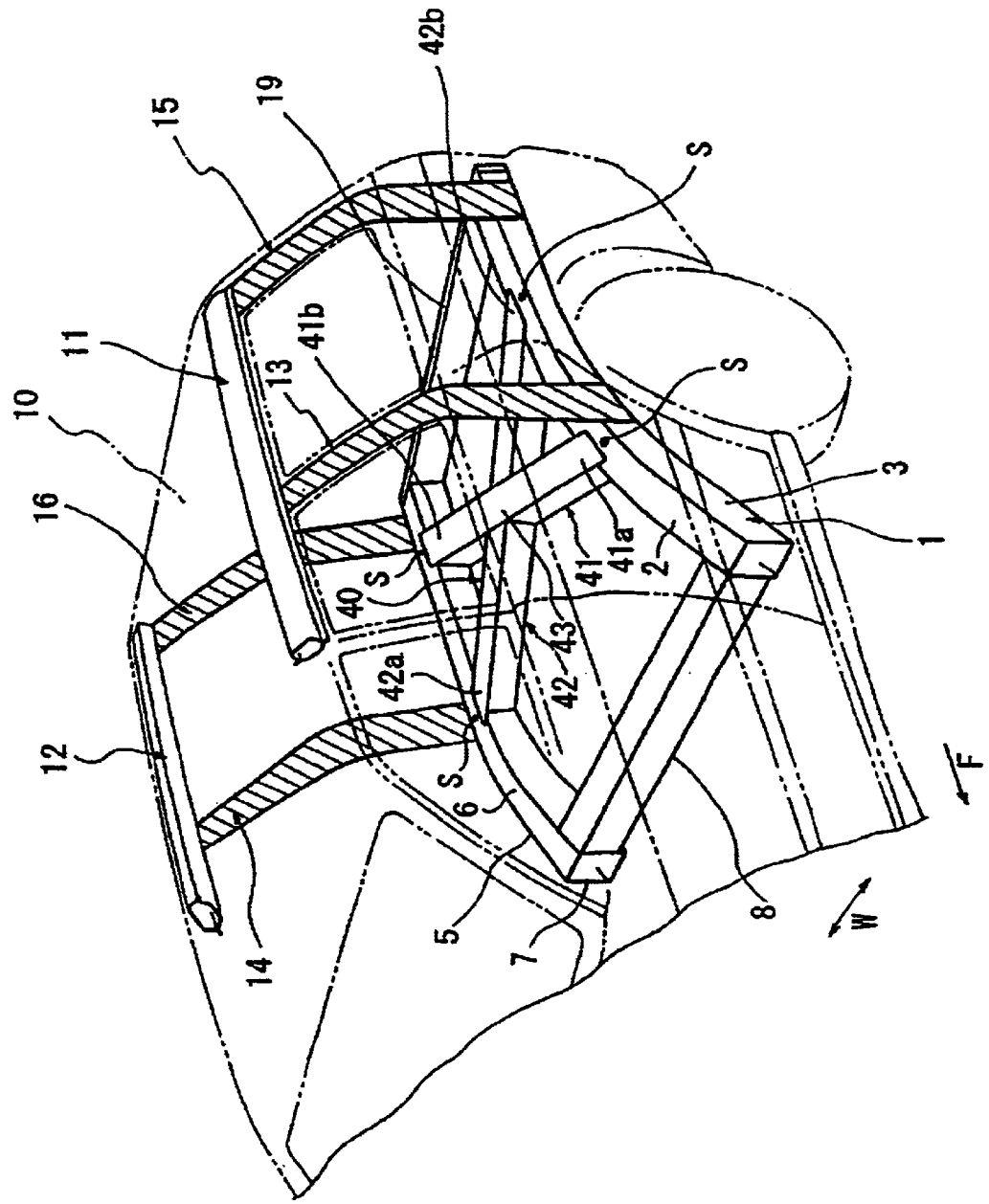
FIG. 10 is a perspective view showing schematically a second embodiment of the rear structure of a vehicle body according to the present invention.

FIG. 10 is a schematically perspective view showing the rear structure of vehicle body. The first crossmember 41 is bridged between the right and left rear side frames 1 and 5. The front end 41a of first crossmember 41 is connected to the rear side frame 1 in the vicinity of a portion S for mounting a rear suspension, and simultaneously the rear, end 41b of first crossmember 41 is connected to the other rear side frame 5 in the vicinity of a portion S for mounting suspension, the first crossmember 41 linearly shifting to the rear side of the body with moving form the rear side frame 1 to the other rear side frame 5. On the other hand, the second crossmember 42 is bridged between the right and left rear side frames 1 and 5. The front end 42a of the second crossmember 42 is connected to the rear side frame 5 corresponding to a portion S for mounting a rear suspension, and simultaneously the rear end 42b of second crossmember 42 is connected to the other rear side frame 1 corresponding to a portion S for mounting a rear suspension, the second crossmember 42 linearly shifting to the rear side of the body with moving form the rear side frame 5 to the rear side frame 1 and intersecting to the first crossmember 41 at its central portion.

These first and second crossmembers 41 and 42 are in the form of pipe having section view of rectangular which are formed by hydroforming. In the intersecting portion 43 of the crossmembers, the first and second crossmembers 41 and 42 are connected each other to form the crossmember 40 in the form of approximate "X" in plan view.

Figure 11:
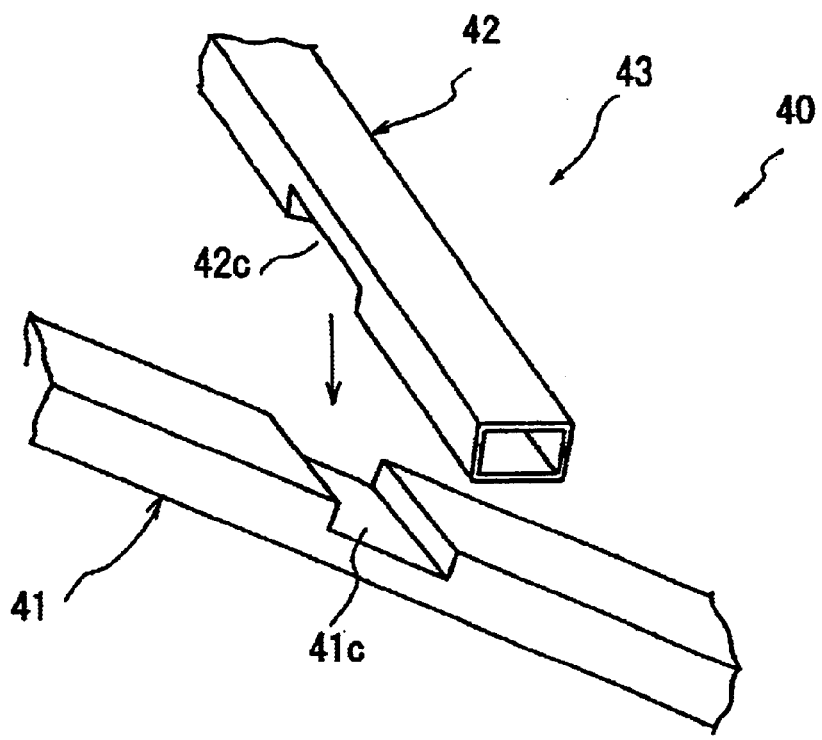
FIG. 11 is a view for explaining the intersecting portion of the first and second crossmembers.
Figure 12:
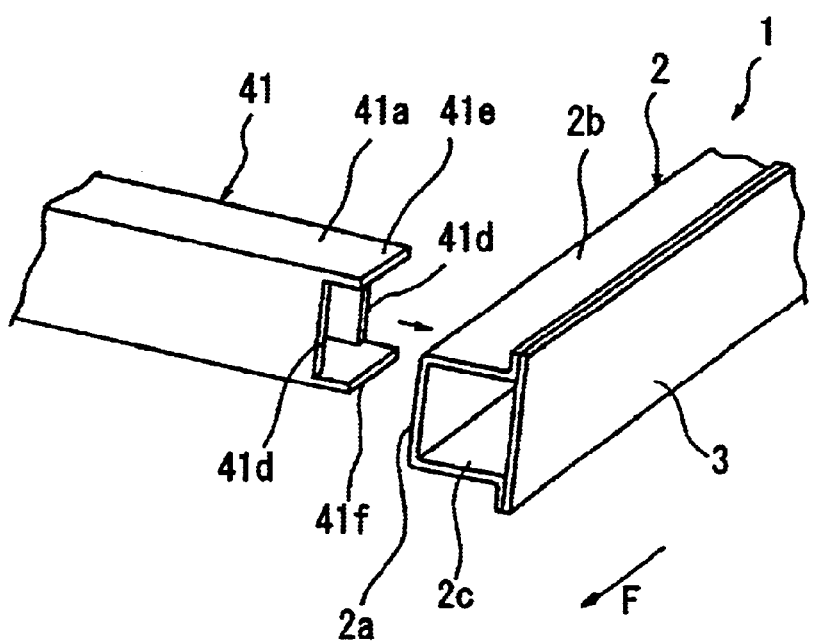
FIG. 12 is a view for explaining the intersecting portion of the first crossmember and the rear side frame.

The intersecting portion 43, as shown in FIG. 11 illustrating a principal and exploded perspective view of the crossmember, is formed as follows: A concave part in the form of approx. rectangular is formed on the upper central portion of the first crossmember 41 to provide a fitting concave part 41c, a concave part in the form of approx. rectangular is formed on the lower central portion of the second crossmember 42 to provide a fitting concave part 42c, and the fitting concaves 41c and 42c are fitted in and welded each other to connect the first crossmember 41 and the second crossmember 42, which results in formation of the crossmember 40 in the form of approximate "X" in plan view.

The connecting portion of the front end 41a of the first crossmember and the rear side frame 1 is performed, as shown in FIG. 11 illustrating a exploded perspective view of the crossmember, as follows: Fitting parts 41d in which the inner panel 2 of the rear side frame 1 is fitted are formed on the front surface and rear surface of the front end 41a of the first crossmember 41, and the flanges 41e, 41f formed on the upper surface and lower surface of the front end 41a are welded to the upper surface 2b and lower surface 2c of the inner panel 2 to connect the front end 41a of the first crossmember 41 to the rear side frame 1. Similarly, the rear end 41b of the first crossmember 41, the front end 42a and rear end 42b of the second crossmember 42 and the rear side frames 1, 5 are also connected one another in the same manner as above.

According to the present embodiment described above, in addition to the constitutions of the first embodiment, the first and second crossmembers 41, 42 are formed by hydroforming having wide freedom of design of the shape and excellent processing characteristics, and the fitting concave part 41c formed on the upper central portion of the first crossmember 41 and the fitting concave part 42c formed on the central portion of the second crossmember 42 are fitted in and connected to each other whereby the connecting stiffness between the intersecting portion 43 of the first crossmember 41 and the second crossmember 42 is easily ensured to bring about the improved stiffness of the crossmember 40. Further, the front ends 41a, 42a and the rear ends 41b, 42b of the first crossmember 41 and the second crossmember 42 are fitted in the rear side frame 1 or 5 and connected to each other by a flange formed by themselves, and therefore the rear side frames 1, 5 and the crossmember 40 are directly connected to each other without a bracket to bring about simplification of the constitution and easily bring about high stiffness of the connecting portion.

Figure 13:
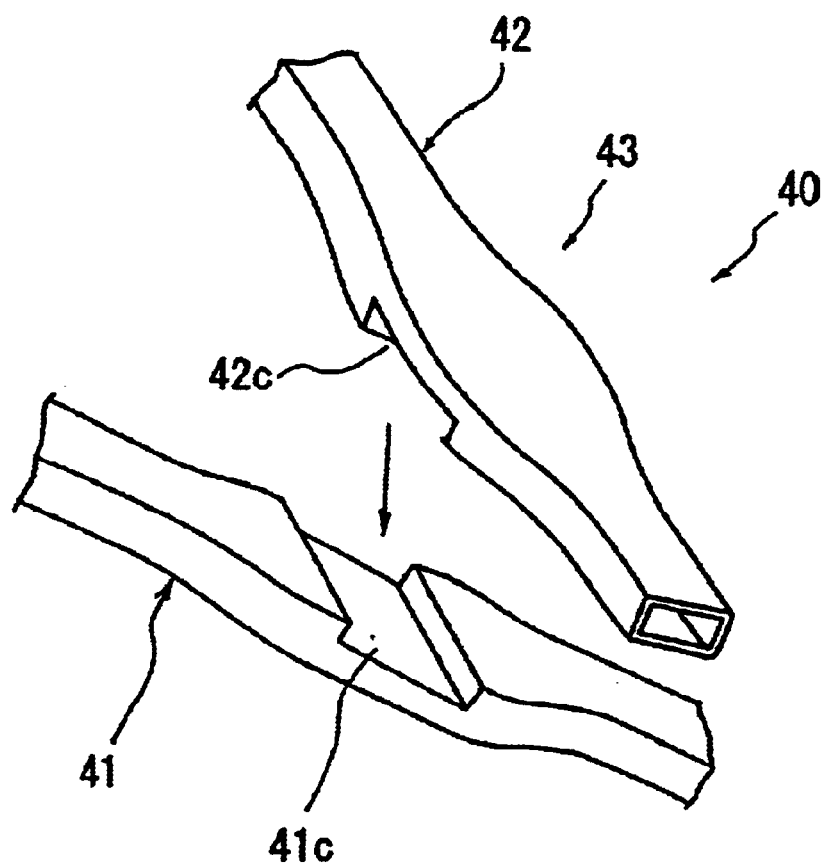
FIG. 13 is a view for explaining the intersecting portion of the first and second crossmembers.

As shown in FIG. 13 illustrating a principal exploded view of the intersecting portion 43, it is also possible that the width of the central portion of the first crossmember 41 where the fitting concave part 41c is formed and the width of the central portion of the second crossmember 42 where the fitting concave part 42c is formed are enlarged to enhance connecting stiffness of the intersecting portion 43.

Similarly to the first embodiment, the front end 41a of the first crossmember 41 is extended to the lower end of C-pillar 13, the rear end 41b to the lower end of the D-pillar 16, the front end 42a of the second crossmember 42 to the lower end of the C-pillar 14, and the rear end 42b to the lower end of the D-pillar 15, respectively, whereby connecting stiffness between the front end 41a of the first crossmember 41 and C-pillar 14 and that between the rear end 41b and D-pillar 16, and that between the front end 42a of the second crossmember 42 and C-pillar 14 and that between the rear end 42b and D-pillar 15 are enhanced to further improve stiffness of the rear portion of the body and simultaneously it is also possible that the impact load applied from the side or the back side of the body is transmitted to the sides and the upper side of the body through C-pillars 13, 14 and D-pillars 15, 16 to be efficiently dispersed to the whole body.

Third Embodiment

The third embodiment is explained by reference of FIG. 14 and FIG. 15. This embodiment is characterized in that the crossmember 50 made of sheet metal is used instead of the crossmember 20 of the first embodiment or the crossmember 40 of the second embodiment, and therefore the other constitutions are the same as in the first embodiment or the second embodiment. Thus the crossmember 50 is mainly explained.

Figure 14:
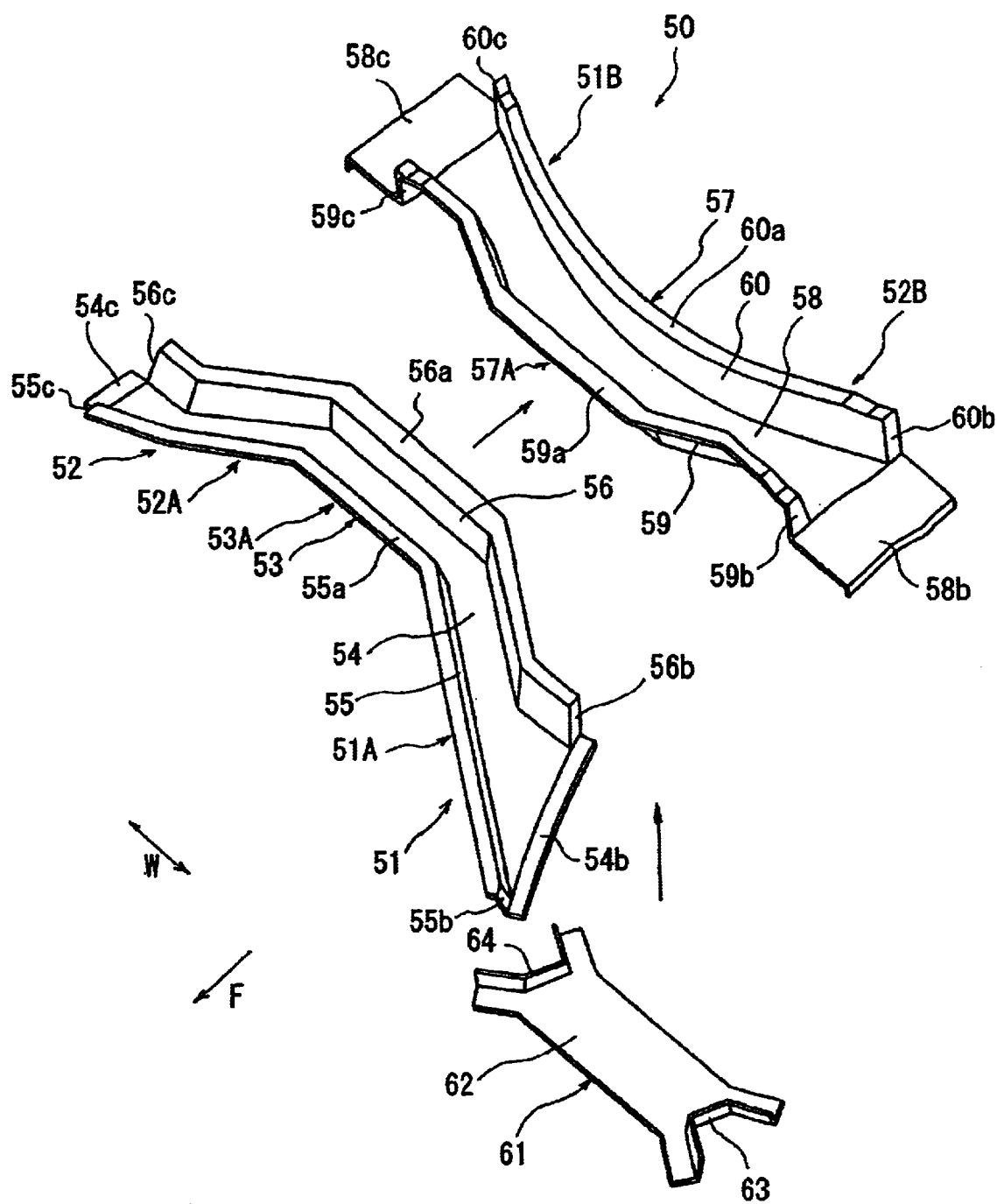
FIG. 14 is an exploded perspective view of the crossmember showing schematically a third embodiment of the rear structure of vehicle body according to the present invention.
Figure 15:
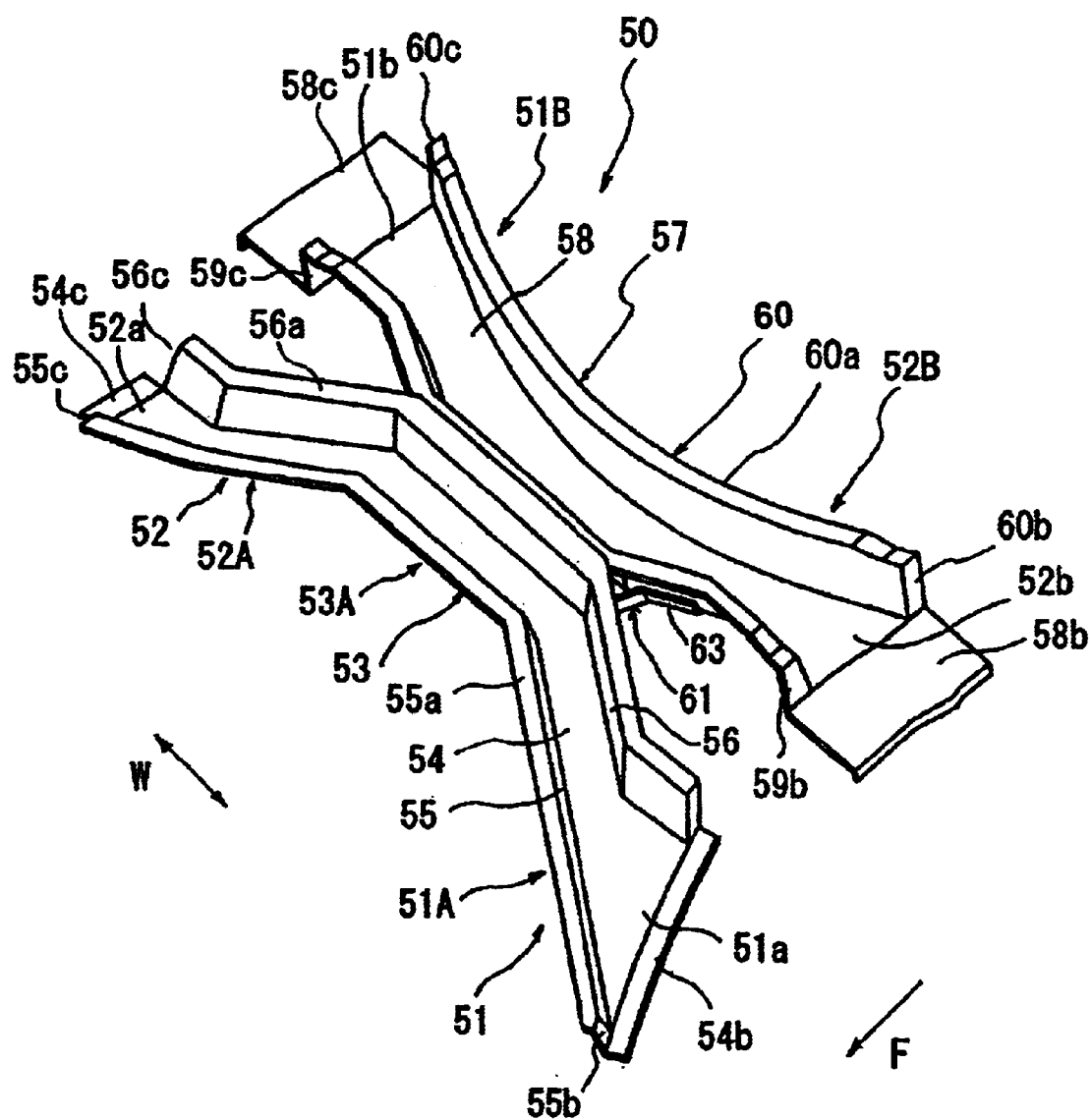
FIG. 15 is a perspective view of the crossmember.
Figure 16:
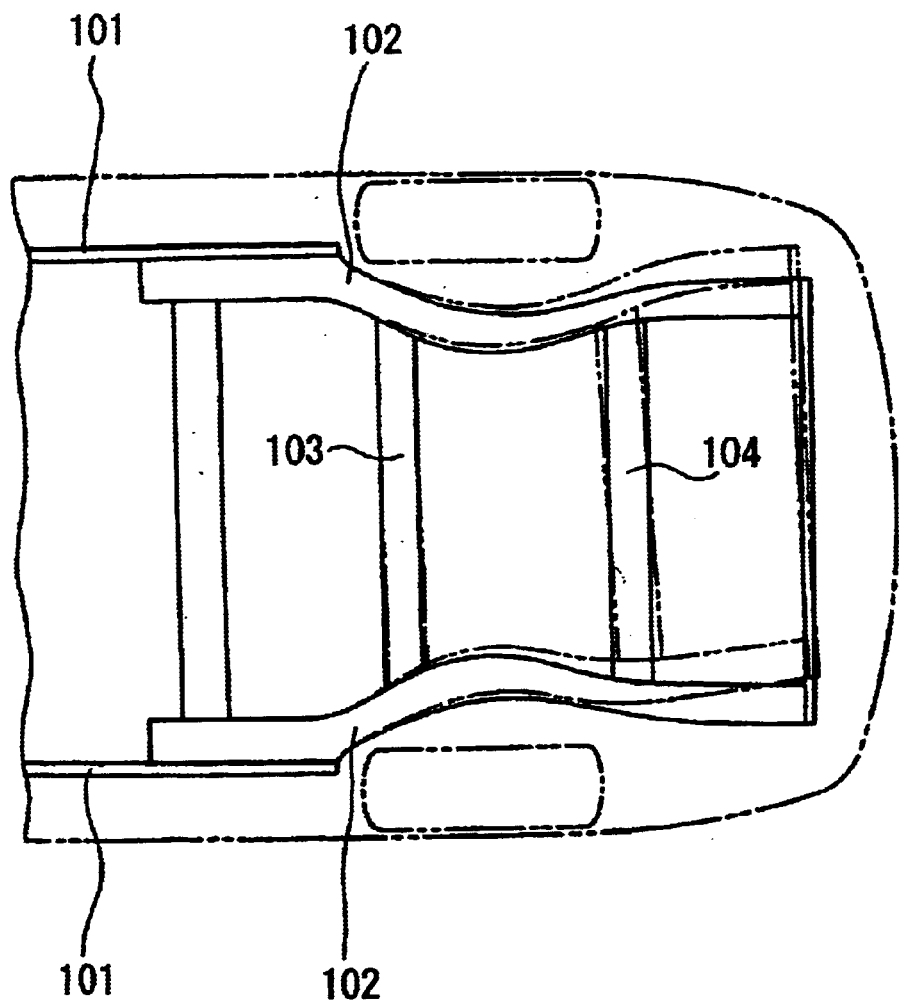
FIG. 16 is a principal plan view showing a conventional rear structure of vehicle body according to the present invention.
Figure 17:
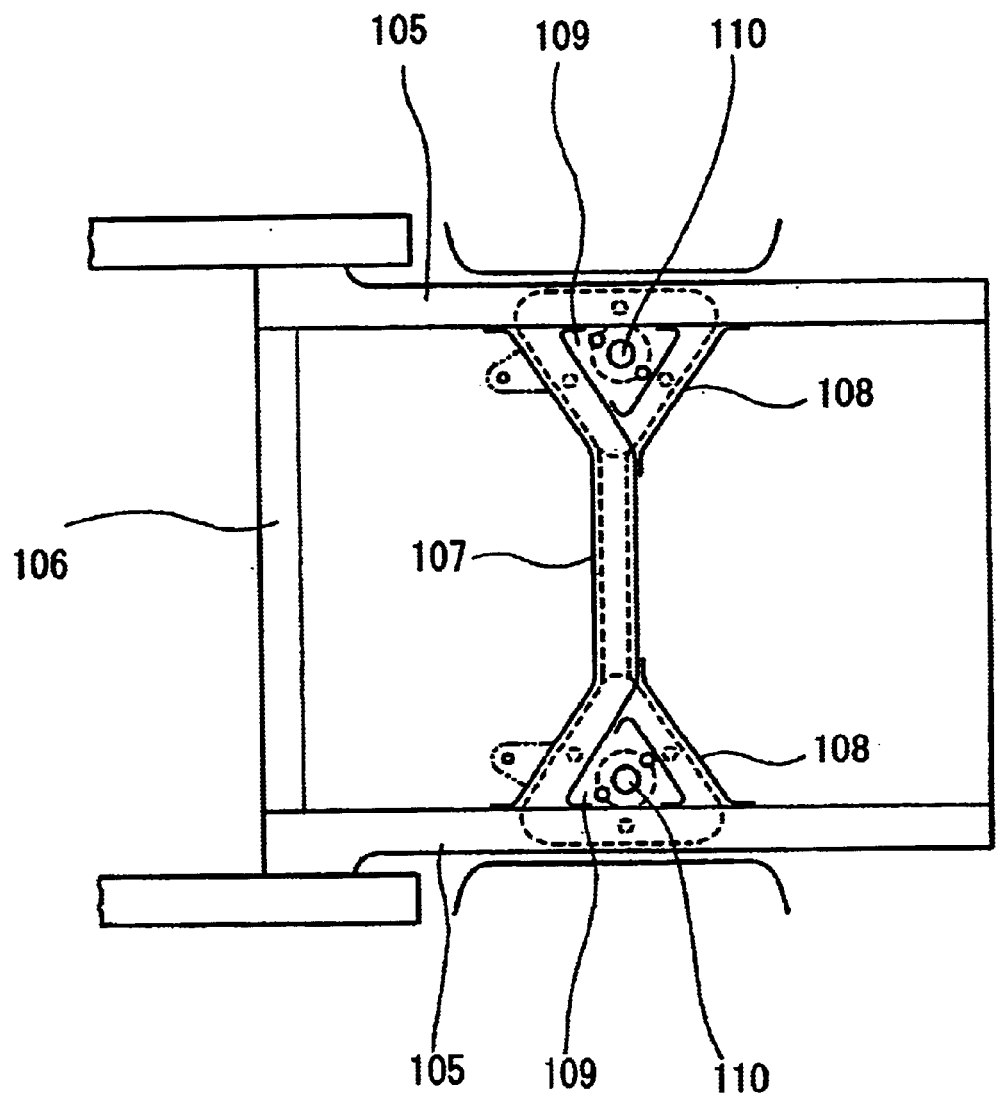
FIG. 17 is a principal plan view showing a conventional rear structure of a vehicle body according to the present invention.
Figure 18:
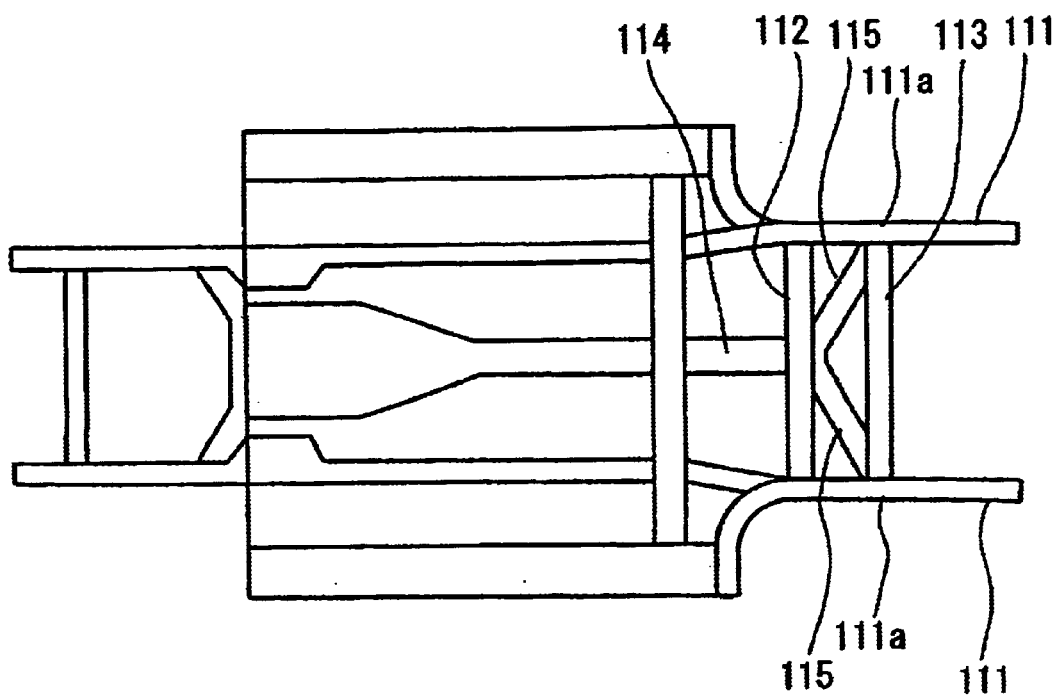
FIG. 18 is a principal plan view showing a conventional rear structure of a vehicle body according to the present invention.

FIG. 14 shows an exploded perspective view of the crossmember 50, and FIG. 15 shows a perspective view of the assembled crossmember 50.

The crossmember 50 is made up of a front crossmember 53 monolithically formed from a front area 51A of a first crossmember 51 and a front area 52A of a second crossmember 52, a rear crossmember 57 monolithically formed from a rear area 51B of a first crossmember 51 and a rear area 52B of a second crossmember 52, and a connecting member 61 for connecting the front crossmember 53 and the rear crossmember 57.

The front crossmember 53 is composed of a bottom surface 54, a front surface 55 and a rear surface 56 and is in the form of "U" in section view, the front crossmember 53 extending approximately in the width direction of the body to be opened upward. Flanges 55a, 56a, which connect to a under surface of the floor panel, are formed on the upper edges of the front surface 55 by bending and the rear surface 56, a flange 54b, which connects to a under surface 2c of the rear side frame 1 in the vicinity of the portion for mounting a suspension, is formed on one end of the bottom surface 54, and flanges 55b, 56b, which connect to the inner surface 2a of the rear side frame 1, are formed on one end of the front surface 55 and one end of the rear surface 56 by bending. Similarly, a flange 54c, which connects to a under surface 6c of the rear side frame 5 in the vicinity of the portion for mounting a suspension, is formed on the other end of the bottom surface 54, and flanges 55c, 56c, which connect to the inner surface 6a of the rear side frame 1, are formed on the other ends of the front surface 55 and the rear surface 56 by bending. This front crossmember 53 has a central portion 53A positioned on a central portion in the width direction of the body and extending in the width direction, a linear front area 51A shifting to the front side of the body with moving from the central portion 53A to the rear side frame 1, and a linear front area 52A shifting to the front side of the body with moving from the central portion 53A to the rear side frame 5.

On the other hand, the rear crossmember 57 is composed of a bottom surface 58, a front surface 59 and a rear surface 60 and is in the form of "U" in section view, the rear crossmember 57 extending approximately in the width direction of the body to be opened upward. Flanges 59a, 60a, which connect to a under surface of the floor panel, are formed on the upper edges of the front surface 59 and the rear surface 60 by bending, a flange 58b, which connects to an under surface 2c of the rear side frame 1 in the vicinity of the portion for mounting a suspension, is formed on one end of the bottom surface 58, and flanges 59b, 60b, which connect to the inner surface 2a of the rear side frame 1, are formed on one end of the front surface 59 and one end of the rear surface 60 by bending. Similarly, a flange 58c, which connects to a under surface 6c of the rear side frame 5 in the vicinity of the portion for mounting a suspension, is formed on the other end of the bottom surface 58, and flanges 59c, 60c, which connect to the inner surface 6a of the rear side frame 5, are bent and formed on the other end of the front surface 59 and the other end of the rear surface 60 by bending. This rear crossmember 57 has a central portion 57A positioned on a central portion of the body in the width direction and extending in the width direction, a linear rear area 52B shifting to the rear side of the body with moving from the central portion 57A to the rear side frame 1, and a linear rear area 51B shifting to the rear side of the body with moving from the central portion 57A to the rear side frame 5.

The connecting member 61 is composed of a base portion 62 bridged between the bottom surface 54 of the central portion 53A of the front crossmember 53 and the bottom surface 58 of the central portion 57A of the rear crossmember 57, a flange 63 formed on the front end of the base portion by bending and connected to the rear surface 56 of the front crossmember 53, and a flange 64 formed on the rear end of the base portion by bending and connected to the front surface 59 of the rear crossmember 57.

The front crossmember 53 and the rear crossmember 57 are monolithically combined with each other, as shown in FIG. 15 illustrating the perspective view, by putting the base portion 62 of the connecting member 61 on both of the bottom surface 54 of the front crossmember 53 and the bottom surface 58 of the rear crossmember 57 and welding them, and simultaneously welding the flange 63, 64 to the corresponding portions of the rear surface 56 of the front crossmember 53 and the front surface 59 of the rear crossmember 57. By this connection (bonding), the front area 51A of the front crossmember 53 and the rear area 51B of the rear crossmember 57 extend continuously and linearly to form an approximate linear first crossmember 51, and simultaneously the front area 52A of the front crossmember 53 and the rear area 51B of the rear crossmember 57 extend continuously and linearly to form an approximate linear second crossmember 52, whereby a crossmember 50 in the form of approximate "X" in plan view, in which the first crossmember 51 and the second crossmember 52 are intersected each other, can be formed.

In the resultant crossmember, the flanges 55a, 56a of the front crossmember 53 and the flanges 59a, 60a of the rear crossmember 57 are welded to the floor panel between the right and left crossmembers 1 and 5 to form a hollow having closed cross section which consists of the front crossmember 53 and the floor panel and which continuously extends along the central portion 53A and the front areas 51A and 52A of the crossmember 53 and to simultaneously form a hollow having closed cross section which continuously extends along the central portion 57A and the rear areas 51B and 52B.

Further, the flange 54b formed on one end of the bottom surface 54 of the front crossmember 53 is welded to the lower surface 2c of the rear side frame 1, and the flanges 55b, 56b formed on one ends of the bottom surfaces 55 and 56 are welded to the inner surface 2a of the rear side frame 1, whereby the front end 51a of the front area 51A of the front crossmember 53 is connected to the rear side frame 1 in the vicinity of a structure (portion) for mounting a suspension. Similarly, the flanges 54c, 55c, 56c are welded to the lower surfaces 6c and inner surface 6a of the other rear side frame 5, whereby the front end 52a of the front area 52A of the front crossmember 53 is connected to the rear side frame 5 in the vicinity of a structure (portion) for mounting a suspension.

Further, the flange 58b formed on one end of the bottom surface 58 of the rear crossmember 57 is welded to the lower surface 2c of the rear side frame 1, and the flanges 59b, 60b are welded to the inner surface 2a of the rear side frame 1, whereby the rear end 52a of the rear area 52B of the rear crossmember 57 is connected to the rear side frame 1 in the vicinity of a structure (portion) for mounting a suspension. Similarly, the flanges 58c, 59c, 60c formed on one end of the bottom surface 58, front surface 59 and rear surface 60 of the other rear crossmember 57 respectively are welded to the lower surfaces 6c and inner surface 6a of the other rear side frame 5, whereby the rear end 51b of the rear area 51B of the rear crossmember 57 is connected to the rear side frame 5 in the vicinity of a structure (portion) for mounting a suspension.

In the rear structure of the vehicle body described above, similarly to the first embodiment, the crossmember 50 in the form of "X" in plan view obtained by obliquely intersecting and connecting the first crossmember 51 to the second crossmember 52 is bridged between the right and left rear side frames 1, 5, the first crossmember 51 in the form of straight line being formed from the front area 51A of the front crossmember 53 and the rear area 51B of the rear crossmember 57, and the second crossmember 52 in the form of straight line being formed from the front area 52A of the front crossmember 53 and the rear area 52B of the rear crossmember 57. Hence, in case impact load and vibration applied from the suspension members during driving cause deformation in torsion of the body, counter-force (reaction) to the tension or compression by the impact load and vibration generated in the first and second crossmembers 21, 22 depresse the relative deformation of the right and left rear side frames 1, 5 to greatly enhance stiffness of the body such as stiffness in torsion of the rear body. Further, the enhanced stiffness of the rear body can ensure high stiffness of the whole body, and high stiffness for supporting a suspension is also obtained to ensure drivability and driving stability. Further, in case impact load is applied from the side or the rear side, the impact load is efficiently dispersed and transmitted to the whole body to relax the impact against the crews ensuring safety of the crews.

In addition to the first embodiment, the third embodiment uses relative thin sheet metal for forming the crossmember 50, whereby the weight of the vehicle body is reduced and the crossmember 50 can be prepared by a pressing having excellent productivity to bring about reduction of production cost.

Further, the front end 51a of the first crossmember 51 is extended to the lower end of C-pillar 13, similarly, the rear end 51b to the lower end of the D-pillar 16, the front end 52a of the second crossmember 52 to the lower end of the C-pillar 14, and the rear end 52b to the lower end of the D-pillar 15, respectively, whereby connecting stiffness between the front end 51a of the first crossmember 51 and C-pillar 13, that between the rear end 52b and D-pillar 16, that between the front end 52a of the second crossmember 52 and C-pillar 14 and that between the rear end 51b and D-pillar 15, are enhanced to further improve the stiffness of the rear portion of the body and simultaneously it is also possible that the impact load applied from the side or the back side of the body is transmitted to the side and the upper side of the body through C-pillars 13, 14 and D-pillars 15, 16 to be efficiently dispersed to the whole body.

EFFECT OF THE INVENTION

According to the rear structure of the vehicle body of the invention, the crossmember in the form of approximate "X" in plan view formed by obliquely intersecting a first crossmember and a second crossmember is disposed between the right and left rear side frames, while at least one of the front ends of the first and second crossmembers and the rear ends of the first and second crossmembers is connected to the rear side frames in vicinity of a structure to be equipped with a suspension, or directly connected to the structure. Therefore, the first and second crossmembers suppress relative deformation of the right and left rear side frames to give high stiffness of the rear portion of the body and to enhance stiffness for supporting a suspension. Further, if impact load is applied to the body from its side or its rear, the impact load can be dispersed efficiently from the one of the rear side frames to the other of the frames through the X-shaped crossmembers, whereby the impact load can be dispersed to the whole body. Further, the simple structure obtained by intersecting the first and second crossmembers to bridge between the right and left rear side frames brings about improvement of the body stiffness and stiffness for supporting a suspension and reduction of body weight.

The disclosure of Japanese Patent Application No. 2002-320084, dated Nov. 1, 2002, including the specification, drawings and abstract, is hereby incorporated by reference in its entirety.

While the presently preferred embodiments of the present invention have been shown and described, it is to be understood that disclosures are for the purpose of illustration and that various changes and modification may be made without departing from the scope of the invention as set forth in the appended claims.

We claim:

1. A rear structure of a vehicle body provided with right and left rear side frames disposed on right and left sides of the body and extending in the fore-and-aft direction of the body, and crossmembers bridged between the right and left rear side frames;
   the crossmembers being approximately an X-shape in plan view and comprising a first crossmember and a second crossmember,
   the first crossmember having a front end connected to one of the rear side frames and a rear end connected to the other of the rear side frames, and extending in the rear direction of the body from the front end to the rear end while receding from one of the rear side frames,
   the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;
   wherein at least one of the front ends of the first and second crossmembers and the rear ends of the first and second crossmembers is directly connected to a structure to be equipped with a suspension.

2. The rear structure of a vehicle body as defined in claim 1, wherein the vehicle body has right and left C-pillars extending in the vertical direction of the body, and the front ends of the first and second crossmembers are extended to the lower ends of the C-pillars, respectively.

3. The rear structure of a vehicle body as defined in claim 1, wherein the vehicle body has right and left D-pillars extending in the vertical direction of the body, and the rear ends of the first and second crossmembers are extended to the lower ends of the D-pillars, respectively.

4. The rear structure of a vehicle body as defined in claim 1, further comprising a third crossmember extending in a widthwise direction of the vehicle body, and said third crossmember being connected to front ends of said right and left rear side frames such that said third crossmember is positioned as a front portion of said rear structure.

5. The rear structure of a vehicle body as defined in claim 1, wherein the structure to be equipped with a suspension is connected to the crossmember within the rear side frames.

6. The rear structure of a vehicle body as defined in claim 5, wherein the vehicle body has right and left C-pillars extending in the vertical direction of the body, and the front ends of the first and second crossmembers are extended to the lower ends of the C-pillars, respectively.

7. The rear structure of a vehicle body as defined in claim 5, wherein the vehicle body has right and left D-pillars extending in the vertical direction of the body, and the rear ends of the first and second crossmembers are extended to the lower ends of the D-pillars, respectively.

8. The rear structure of a vehicle body as defined in claim 5, wherein the structure to be equipped with a suspension is a pipe disposed within the rear side frames and attached to a member of the suspension to support it.

9. The rear structure of a vehicle body as defined in claim 8, wherein the vehicle body has right and left C-pillars extending in the vertical direction of the body, and the front ends of the first and second crossmembers are extended to the lower ends of the C-pillars, respectively.

10. The rear structure of a vehicle body as defined in claim 8, wherein the vehicle body has right and left D-pillars extending in the vertical direction of the body, and the rear ends of the first and second crossmembers are extended to the lower ends of the D-pillars, respectively.

11. A rear structure of a vehicle body provided with right and left rear side frames disposed on right and left sides of the body and extending in the fore-and-aft direction of the body, and crossmembers bridged between the right and left rear side frames;
    the crossmembers being approximately an X-shape in plan view and comprising a first crossmember and a second crossmember,
    the first crossmember having a front end connected to one of the rear side frames and a rear end connected to the other of the rear side frames, and extending in the rear direction of the body from the front end to the rear end while receding from one of the rear side frames,
    the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;
    wherein at least one of the front ends of the first and second crossmembers and the rear ends of the first and second crossmembers is connected to the rear side frames in vicinity of a structure to be equipped with a suspension; and
    wherein the intersecting portion is formed by compressing the first and second crossmembers in a vertical direction to deform to a plane shape and control height, and enlarging the contacting portions of the connected first and second crossmembers.

12. The rear structure of a vehicle body as defined in claim 11, wherein a weld is provided at the enlarged contacting portions of the first and second crossmembers.

13. A rear structure of a vehicle body provided with right and left rear side frames disposed on right and left sides of the body and extending in the fore-and-aft direction of the body, and crossmembers bridged between the right and left rear side frames;
    the crossmembers being approximately an X-shape in plan view and comprising a first crossmember and a second crossmember,
    the first crossmember having a front end connected to one of the rear side frames and a rear end connected to the other of the rear side frames, and extending in the rear direction of the body from the front end to the rear end while receding from one of the rear side frames,
    the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;
    wherein at least one of the front ends of the first and second crossmembers and the rear ends of the first and second crossmembers is connected to the rear side frames in vicinity of a structure to be equipped with a suspension;
    wherein the intersecting portion comprises a joint into which interior ends of sections of each of the first and second crossmembers are inserted; and
    wherein the ends of said sections of each of the first and second crossmembers are threaded into said joint.

14. A rear structure of a vehicle body provided with right and left rear side frames disposed on right and left sides of the body and extending in the fore-and-aft direction of the body, and crossmembers bridged between the right and left rear side frames;

the crossmembers being approximately an X-shape in plan view and comprising a first crossmember and a second crossmember, the first crossmember having a front end connected to one of the rear side frames and a rear end connected to the other of the rear side frames, and extending in the rear direction of the body from the front end to the rear end while receding from one of the rear side frames, the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;

wherein at least one of the front ends of the first and second crossmembers and the rear ends of the first and second crossmembers is connected to the rear side frames in vicinity of a structure to be equipped with a suspension; and wherein the intersecting portion includes interconnecting notched sections of said first and second crossmembers.

15. A rear structure of a vehicle body provided with right and left rear side frames disposed on right and left sides of the body and extending in the fore-and-aft direction of the body, and crossmembers bridged between the right and left rear side frames;

the crossmembers being approximately an X-shape in plan view and comprising a first crossmember and a second crossmember, the first crossmember having a front end connected to one of the rear side frames and a rear end connected to the other of the rear side frames, and extending in the rear direction of the body from the front end to the rear end while receding from one of the rear side frames, the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;

wherein at least one of the front ends of the first and second crossmembers and the rear ends of the first and second crossmembers is connected to the rear side frames in vicinity of a structure to be equipped with a suspension; and wherein the first and second crossmembers are formed by joining a front crossmember structure and a rear crossmember structure, with the front crossmember structure having an intermediate area extending further aft than ends of said front crossmember structure and said rear crossmember structure having an intermediate area extending further forward than ends of said rear crossmember structure, and wherein said intermediate areas are in contact to form said X-shape.

16. The rear structure of a vehicle body as defined in claim 15, further comprising a connecting member bridging said intermediate areas and connecting said front and rear crossmember structures at the intersecting portion.

17. A rear structure of a vehicle body provided with right and left rear side frames disposed on right and left sides of the body and extending in the fore-and-aft direction of the body, and crossmembers bridged between the right and left rear side frames;

the crossmembers being approximately an X-shape in plan view and comprising a first crossmember and a second crossmember, the first crossmember having a front end connected to one of the rear side frames and a rear end connected to the other of the rear side frames, and extending in the rear direction of the body from the front end to the rear end while receding from one of the rear side frames, the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;

wherein at least one of the front ends of the first and second crossmembers and the rear ends of the first and second crossmembers is connected to the rear side frames in vicinity of a structure to be equipped with a suspension, and wherein the vehicle body has right and left C-pillars extending in the vertical direction of the body, and the front ends of the first and second crossmembers are extended to the lower ends of the C-pillars, respectively.

18. A rear structure of a vehicle body provided with right and left rear side frames disposed on right and left sides of the body and extending in the fore-and-aft direction of the body, and crossmembers bridged between the right and left rear side frames;

the crossmembers being approximately an X-shape in plan view and comprising a first crossmember and a second crossmember, the first crossmember having a front end connected to one of the rear side frames and a rear end connected to the other of the rear side frames, and extending in the rear direction of the body from the front end to the rear end while receding from one of the rear side frames, the second crossmember having a front end connected to the other of the rear side frames and a rear end connected to one of the rear side frames, and extending in the rear direction of the body from the front end to the rear end while receding from the other of the rear side frames and intersecting with the first crossmember to be connected to one of the rear side frames;

wherein at least one of the front ends of the first and second crossmembers and the rear ends of the first and second crossmembers is connected to the rear side frames in vicinity of a structure to be equipped with a suspension, and wherein the vehicle body has right and left D-pillars extending in the vertical direction of the body, and the rear ends of the first and second crossmembers are extended to the lower ends of the D-pillars, respectively.

* * * * *